US007978269B2

(12) United States Patent
Matsuoka et al.

(10) Patent No.: US 7,978,269 B2
(45) Date of Patent: Jul. 12, 2011

(54) PORTABLE TELEVISION-BROADCAST RECEPTION UNIT, TELEVISION-BROADCAST RECEPTION METHOD, TELEVISION-BROADCAST RECEPTION PROGRAM, AND COMPUTER-READABLE RECORD MEDIUM WITH TELEVISION-BROADCAST RECEPTION PROGRAM

(75) Inventors: Masayoshi Matsuoka, Aichi (JP); Yusuke Mizuno, Aichi (JP); Takefumi Oota, Aichi (JP); Satoshi Abe, Aichi (JP); Kenichi Tsuchiya, Aichi (JP)

(73) Assignee: Panasonic Corporation, Osaka (JP)

( * ) Notice: Subject to any disclaimer, the term of this patent is extended or adjusted under 35 U.S.C. 154(b) by 1236 days.

(21) Appl. No.: 11/630,834

(22) PCT Filed: Apr. 25, 2006

(86) PCT No.: PCT/JP2006/308621
§ 371 (c)(1),
(2), (4) Date: Dec. 22, 2006

(87) PCT Pub. No.: WO2006/118099
PCT Pub. Date: Nov. 9, 2006

(65) Prior Publication Data
US 2009/0102979 A1 Apr. 23, 2009

(30) Foreign Application Priority Data
Apr. 26, 2005 (JP) ................... 2005-127440

(51) Int. Cl.
*H04N 5/46* (2006.01)
*H04B 1/38* (2006.01)
(52) U.S. Cl. .................... 348/725; 455/556.1

(58) Field of Classification Search .......... 348/725, 348/552–553, 723, 14.01; 725/62, 144; 455/562, 455/556
See application file for complete search history.

(56) References Cited

U.S. PATENT DOCUMENTS
5,177,604 A * 1/1993 Martinez ................. 725/144
(Continued)

FOREIGN PATENT DOCUMENTS
JP 7-212121 8/1995
(Continued)

OTHER PUBLICATIONS
"Mechanism of a mobile phone which enables a user to watch terrestrial digital broadcasting", Nikkei Network, Aug. 2004, pp. 100-105 (along with English Abstract).

*Primary Examiner* — Paulos M Natnael
(74) *Attorney, Agent, or Firm* — Wenderoth, Lind & Ponack, L.L.P.

(57) ABSTRACT

A portable television-broadcast reception unit is provided which is capable of changing the direction of a directional antenna easily to a direction where an enough quality to watch television can be obtained. In this unit: a television-broadcast reception section 20 receives a broadcast wave using a directional antenna 10; a direction measurement section 60 measures the direction of the directional antenna 10; an electric-field strength measurement section 70 measures the electric-field strength value of the received broadcast wave; a storage section 30 stores an electric-field strength management table which includes the direction measured by the direction measurement section 60 and the electric-field strength value measured by the electric-field strength measurement section 70; a control section 40 controls the measurement of the direction and the measurement of the electric-field strength, updates the electric-field strength management table and selects the direction where the maximum electric-field strength value can be obtained; an image-turn processing section 80 turns the received image so that the upper part of the image is oriented to the direction where the maximum electric-field strength value can be obtained; and a display section 50 displays the turned image.

20 Claims, 33 Drawing Sheets

U.S. PATENT DOCUMENTS

| | | | |
|---|---|---|---|
| 5,321,514 A * | 6/1994 | Martinez | 725/62 |
| 5,825,408 A * | 10/1998 | Yuyama et al. | 348/14.01 |
| 6,177,950 B1 * | 1/2001 | Robb | 348/14.01 |
| 6,529,742 B1 * | 3/2003 | Yang | 455/556.1 |
| 7,221,268 B2 * | 5/2007 | Sayers et al. | 340/539.1 |
| 7,359,362 B2 * | 4/2008 | King et al. | 370/338 |
| 2004/0215769 A1 * | 10/2004 | Yoshida et al. | 709/224 |
| 2004/0239792 A1 | 12/2004 | Shibutani et al. | |
| 2005/0075142 A1 * | 4/2005 | Hoffmann et al. | 455/562.1 |
| 2005/0122435 A1 * | 6/2005 | Yunoki | 348/725 |
| 2007/0077941 A1 * | 4/2007 | Gonia et al. | 455/456.1 |
| 2007/0249400 A1 * | 10/2007 | Kaneko et al. | 455/562.1 |

FOREIGN PATENT DOCUMENTS

| | | |
|---|---|---|
| JP | 2001-36320 | 2/2001 |
| JP | 2003-78316 | 3/2003 |
| JP | 2004-145291 | 5/2004 |
| JP | 2004-228695 | 8/2004 |
| JP | 2005-45598 | 2/2005 |

* cited by examiner

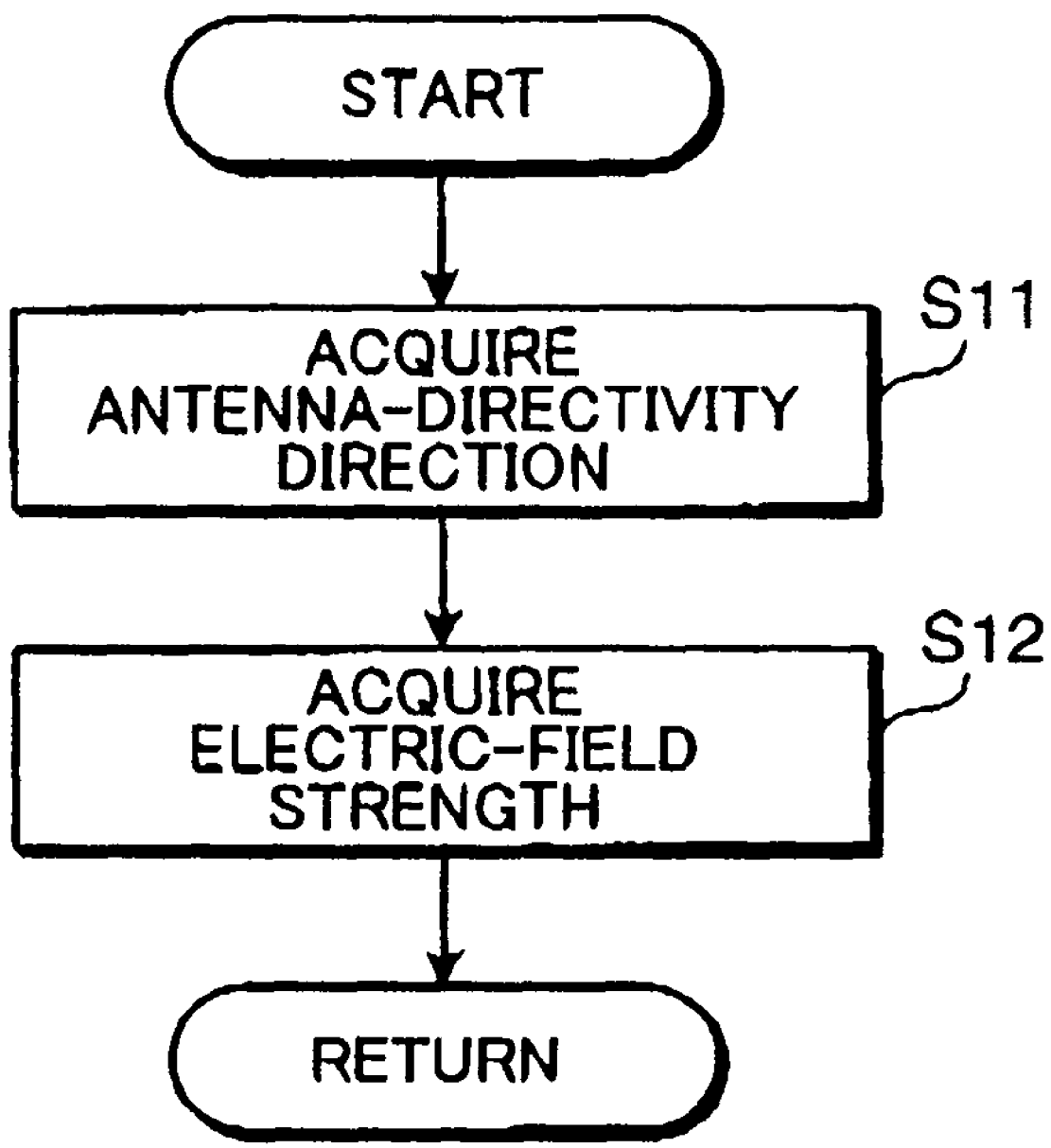

| DIRECTION (DEGREE) | EAST (247.5~292.4) | SOUTH (157.5~202.4) | WEST (67.5~112.4) | NORTH (337.5~22.4) | SOUTHEAST (202.5~247.4) | SOUTHWEST (112.5~157.4) | NORTHWEST (22.5~67.4) | NORTHEAST (292.5~337.4) |
|---|---|---|---|---|---|---|---|---|
| ELECTRIC-FIELD STRENGTH (dB) | MINIMUM NEGATIVE VALUE | MINIMUM NEGATIVE VALUE | 60 | 40 | MINIMUM NEGATIVE VALUE | MINIMUM NEGATIVE VALUE | 50 | MINIMUM NEGATIVE VALUE |
| DIRECTION INFORMATION (DEGREE) | — | — | MAXIMUM 75.0 | — | — | — | CURRENT 25.3 | — |
| IMAGE-ANGLE UPDATE FLAG | UPDATE UNNECESSARY | | | | | | | |

400 — 401 — 402 — 403 — 404

| DIRECTION (DEGREE) | EAST (2475~2924) | SOUTH (1575~2024) | WEST (675~1124) | NORTH (3375~22.4) | SOUTHEAST (2025~2474) | SOUTHWEST (112.5~1574) | NORTHWEST (225~674) | NORTHEAST (2925~3374) |
|---|---|---|---|---|---|---|---|---|
| ELECTRIC-FIELD STRENGTH (dB) | MINIMUM NEGATIVE VALUE | MINIMUM NEGATIVE VALUE | 60 | 40 | MINIMUM NEGATIVE VALUE | 65 | 50 | MINIMUM NEGATIVE VALUE |
| DIRECTION INFORMATION (DEGREE) | — | — | — | — | — | CURRENT/ MAXIMUM 135.5 | — | — |
| IMAGE-ANGLE UPDATE FLAG | UPDATE NECESSARY | | | | | | | |

410 ← (table)
401, 402, 403, 404

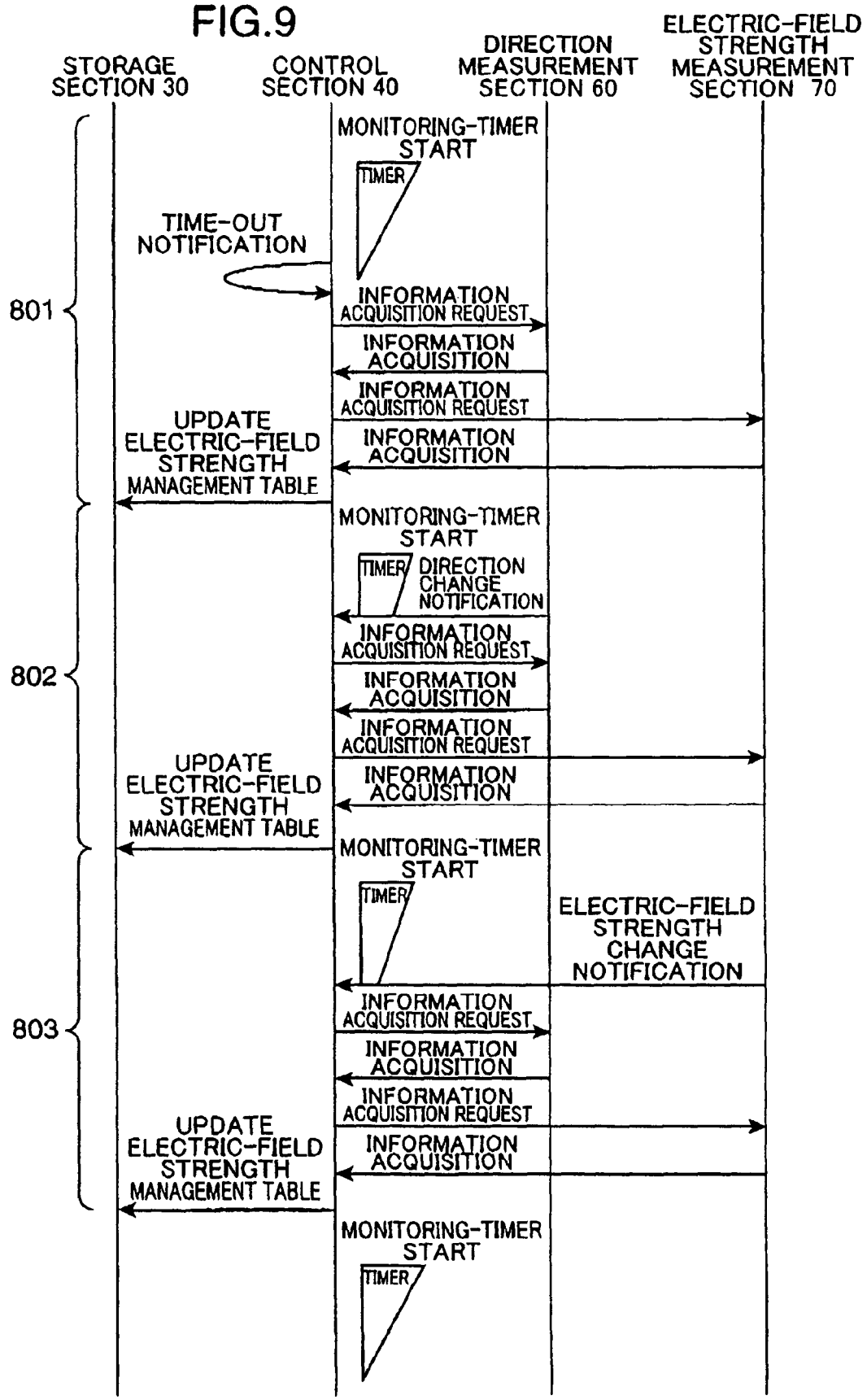

FIG.15

| DIRECTION (DEGREE) | EAST (247.5~292.4) | SOUTH (157.5~202.4) | WEST (67.5~112.4) | NORTH (337.5~22.4) | SOUTHEAST (202.5~247.4) | SOUTHWEST (112.5~157.4) | NORTHWEST (22.5~67.4) | NORTHEAST (292.5~337.4) |
|---|---|---|---|---|---|---|---|---|
| ELECTRIC-FIELD STRENGTH (dB) | MINIMUM NEGATIVE VALUE | MINIMUM NEGATIVE VALUE | 60 | 40 | MINIMUM NEGATIVE VALUE | MINIMUM NEGATIVE VALUE | 50 | MINIMUM NEGATIVE VALUE |
| TIME INFORMATION (YEAR,MONTH,DAY HOUR,MINUTE,SECOND) | — | — | 2005/03/14 12:35:14 | 2005/03/14 12:32:22 | — | — | 2005/03/14 12:38:54 | — |
| POSITION INFORMATION (DEGREE,MINUTE,SECOND SECOND DECIMAL-POINT) | — | — | 35.43.25.38 135.43.25.38 | 35.43.25.20 135.43.25.42 | — | — | 35.43.25.33 135.43.25.40 | — |
| DIRECTION INFORMATION (DEGREE) | — | — | MAXIMUM 75.0 | — | — | — | CURRENT 25.3 | — |
| IMAGE-ANGLE UPDATE FLAG | UPDATE UNNECESSARY | | | | | | | |

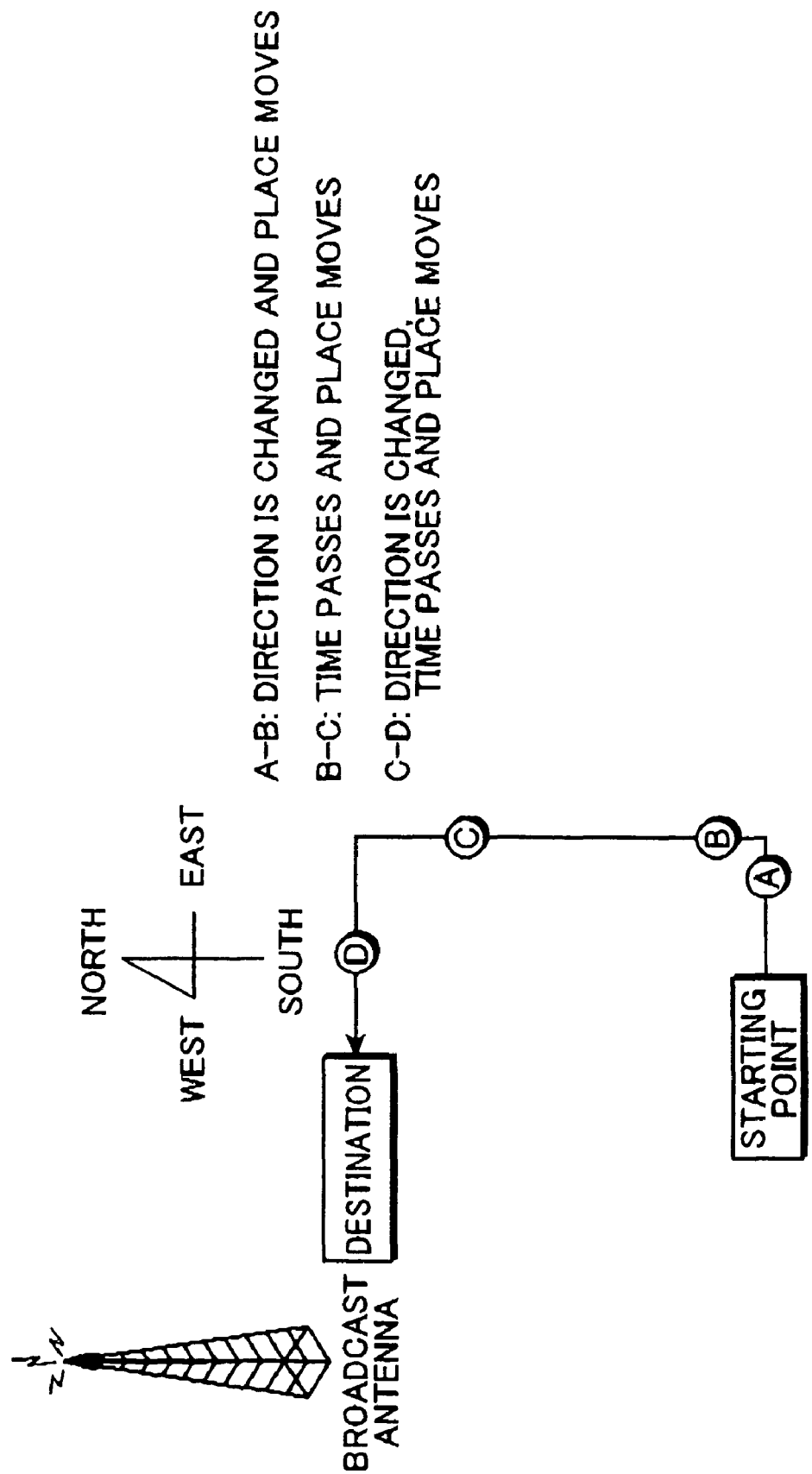

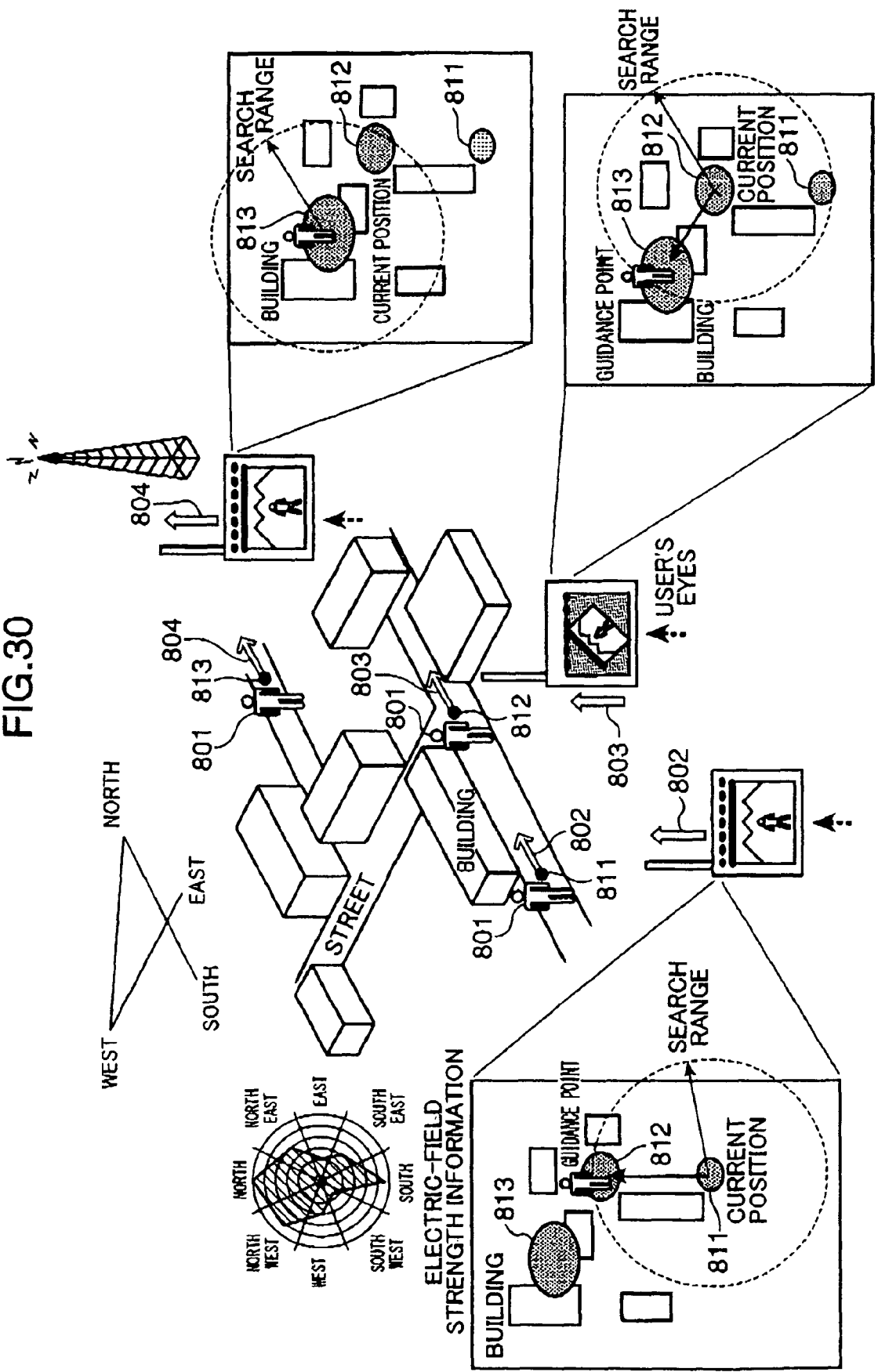

FIG.31

| NUMBER OF INFORMATION PIECES | 3 | |
|---|---|---|
| LONGITUDE 1 | 11000 | |
| LATITUDE 1 | 45000 | |
| ELECTRIC-FIELD STRENGTH INFORMATION 1 | NUMBER OF INFORMATION PIECES | 8 |
| | DIRECTION 11 | ELECTRIC-FIELD STRENGTH 11 |
| | ... | ... |
| | DIRECTION 18 | ELECTRIC-FIELD STRENGTH 18 |
| .... | | |
| LONGITUDE 3 | 12000 | |
| LATITUDE 3 | 46000 | |
| ELECTRIC-FIELD STRENGTH INFORMATION 3 | NUMBER OF INFORMATION PIECES | 2 |
| | DIRECTION 31 | ELECTRIC-FIELD STRENGTH 31 |
| | DIRECTION 32 | ELECTRIC-FIELD STRENGTH 32 |

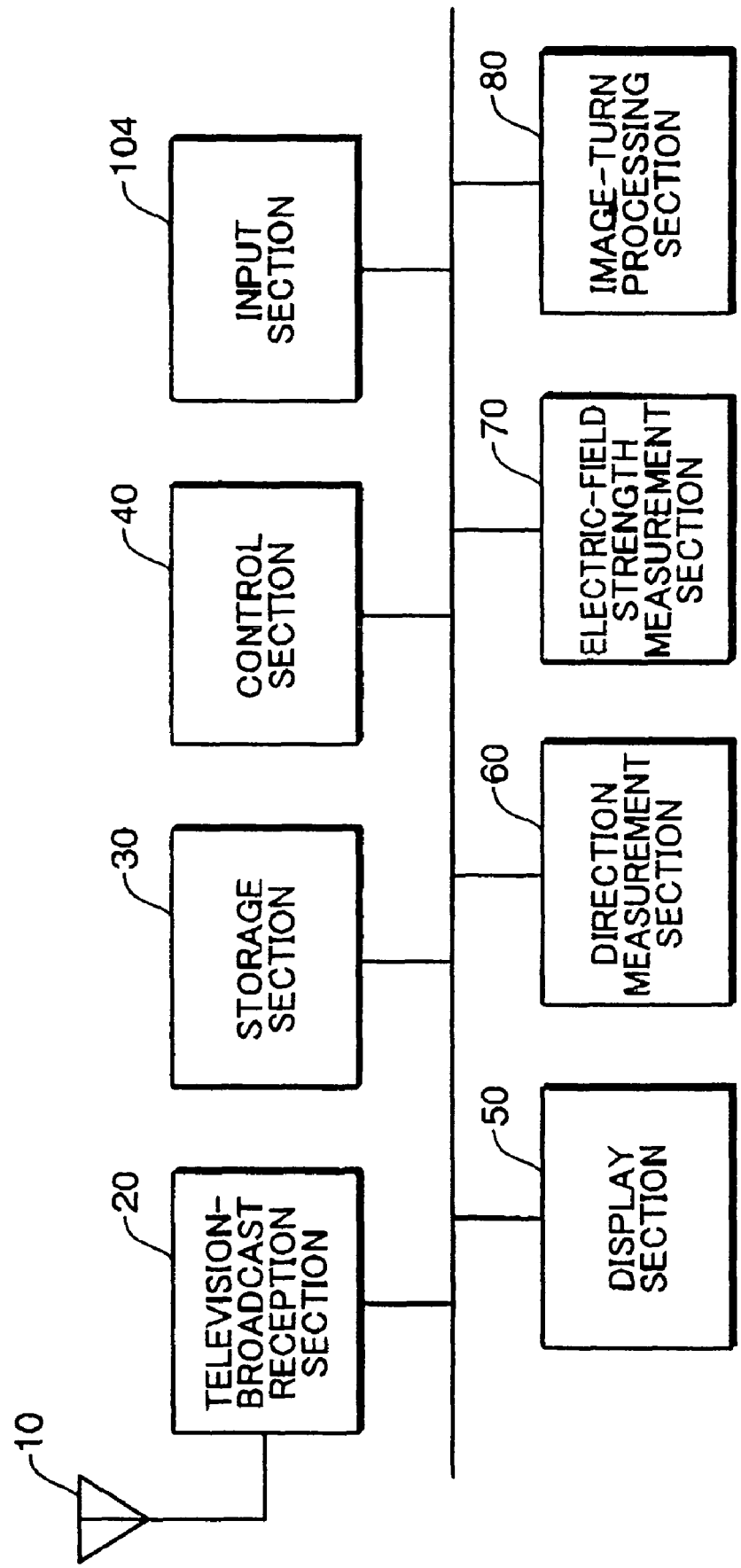

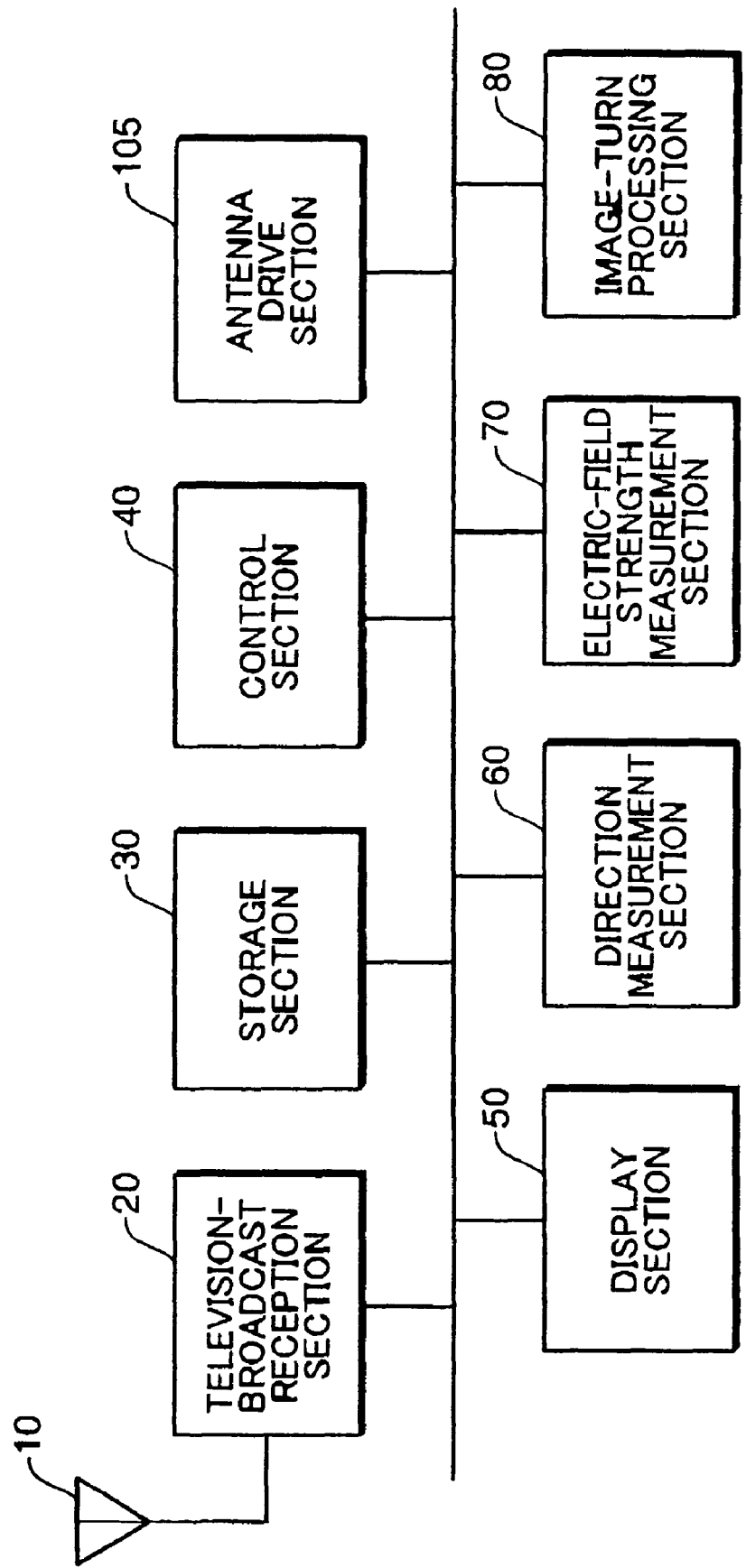

PORTABLE TELEVISION-BROADCAST RECEPTION UNIT, TELEVISION-BROADCAST RECEPTION METHOD, TELEVISION-BROADCAST RECEPTION PROGRAM, AND COMPUTER-READABLE RECORD MEDIUM WITH TELEVISION-BROADCAST RECEPTION PROGRAM

TECHNICAL FIELD

The present invention relates to a portable television-broadcast reception unit which receives a ground-wave digital television broadcast or a ground-wave analog television broadcast for a portable terminal. It also relates, for the same purpose, to a television-broadcast reception method, a television-broadcast reception program, and a computer-readable record medium in which a television-broadcast reception program is recorded.

BACKGROUND ART

As a prior art, a portable terminal according to Non-patent Document 1 is mentioned which is capable of receiving a ground-wave digital broadcast. In order to obtain a great electric-field strength, the portable terminal according to Non-patent Document 1 executes a diversity reception, using both a conventional cellular-phone antenna and an earphone antenna by the code of an earphone used in a portable radio or the like.

In addition, the art of guiding a user to a position in which the electric-field strength is great is proposed in Patent Document 1. In a portable communication terminal according to Patent Document 1, using a geomagnetic sensor or a gyro sensor, an electric-field strength and the direction of a directional antenna are displayed on the screen of the portable communication terminal. This leads the user to the great electric-field strength direction.

The art according to Non-patent Document 1 has a disadvantage in that if no earphones are used, a sufficient electric-field strength is not obtained so that a television broadcast cannot be viewed. In the art according to Patent Document 1, a television broadcast cannot be viewed while searching for the direction in which a great electric-field strength is obtained. Besides, the art according to Patent Document 1 has another disadvantage in that a user is difficult to notify of the direction where an enough electric-field strength to watch television can be obtained.

Patent Document 1: Japanese Patent Laid-Open No. 2001-36320 specification

Non-patent Document 1: "Mechanism of a mobile phone which enables a user to watch terrestrial digital broadcasting", an article in the August 2004 issue of the Nikkei Network, on the Internet <URI:http://itpro.nikkeibp.co.jp/free/TIS.keitai/20040913/149826/index.shtml>.

DISCLOSURE OF THE INVENTION

In order to resolve the above described disadvantages, it is an object of the present invention to provide a portable television-broadcast reception unit, a television-broadcast reception method, a television-broadcast reception program, and a computer-readable record medium in which a television-broadcast reception program is recorded, which are capable of changing the direction of a directional antenna easily to a direction where an enough quality to watch television is obtained.

A portable television-broadcast reception unit according to an aspect of the present invention, comprising: a broadcast reception section which receives a broadcast wave using a directional antenna; a direction measurement section which measures the direction of the directional antenna, a quality measurement section which measures information on the quality of a broadcast wave received by the directional antenna; a storage section which stores measurement information including a direction measured by the direction measurement section and information on a quality measured by the quality measurement section; a control section which controls the measurement of a direction by the direction measurement section and the measurement of information on a quality by the quality measurement section, updates the measurement information stored in the storage section, and selects the direction where the best quality is obtained; an image turn section which turns an image received by the broadcast reception section, so that the upper part of the image is oriented to the direction selected by the control section where the best quality is obtained; and a display section which displays an image turned by the image turn section.

A television-broadcast reception method according to another aspect of the present invention, including: a broadcast receiving step of receiving a broadcast wave using a directional antenna; a direction measuring step of measuring the direction of the directional antenna: a quality measuring step of measuring information on the quality of a broadcast wave received by the directional antenna; a storing step of storing measurement information including a direction measured in the direction measuring step and information on a quality measured in the quality measuring step; a controlling step of controlling the measurement of a direction in the direction measuring step and the measurement of information on a quality in the quality measuring step, updates the measurement information stored in the storage section, and selects the direction where the best quality is obtained; an image turning step of turning an image received in the broadcast receiving step, so that the upper part of the image is oriented to the direction selected in the controlling step where the best quality is obtained; and a displaying step of displaying an image turned in the image turning step.

A television-broadcast reception program according to another aspect of the present invention, allowing a computer to function as: a storage section which stores measurement information including a direction measured by a direction measurement section which measures the direction of a directional antenna and information on a quality measured by a quality measurement section which measures information on the quality of a broadcast wave received by the directional antenna; a control section which controls the measurement of a direction by the direction measurement section and the measurement of information on a quality by the quality measurement section, updates the measurement information stored in the storage section, and selects the direction where the best quality is obtained; an image turn section which turns an image received by a broadcast reception section which receives a broadcast wave using the directional antenna, so that the upper part of the image is oriented to the direction selected by the control section where the best quality is obtained; and a display section which displays an image turned by the image turn section.

A computer-readable record medium in which a television-broadcast reception program is recorded according to another aspect of the present invention, allowing a computer to function as: a storage section which stores measurement information including a direction measured by a direction measurement section which measures the direction of a directional antenna and information on a quality measured by a quality measurement section which measures information on the quality of a broadcast wave received by the directional antenna; a control section which controls the measurement of a direction by the direction measurement section and the measurement of information on a quality by the quality measurement section, updates the measurement information stored in the storage section, and selects the direction where the best quality is obtained; an image turn section which turns an image received by a broadcast reception section which receives a broadcast wave using the directional antenna, so that the upper part of the image is oriented to the direction selected by the control section where the best quality is obtained; and a display section which displays an image turned by the image turn section.

According to these configurations, a broadcast wave is received by a directional antenna. In a storage section, measurement information is stored which includes the direction of the directional antenna and information on the quality of a broadcast wave received by the directional antenna. The measurement of a direction of the directional antenna and the measurement of information on a quality is controlled, the measurement information stored in the storage section is updated, and the direction where the best quality can be obtained is selected. Then, a received image is turned so that the upper part of the image is oriented to the selected direction where the best quality can be obtained, and the turned image is displayed.

According to the present invention, the upper part of a displayed image coincides with the direction in which the best quality can be obtained. This helps lead the direction of a directional antenna toward the image's upper part. Thereby, the directional antenna's direction can be easily changed to a direction where an enough quality to watch television is obtained.

The objects, characteristics, aspects and advantages of the present invention will be more obvious in the following detailed description and attached drawings.

BRIEF DESCRIPTION OF THE DRAWINGS

FIG. 3 is a flow chart, showing a measurement processing in the step S2 of FIG. 2.

FIG. 9 is a representation, showing an update sequence in which an electric-field strength management table is updated.

FIG. 15 is a representation, showing an example of an electric-field strength management table in the second embodiment.

FIG. 17 is a representation, showing the processing for deleting information in the second embodiment.

FIG. 30 is a representation, showing a variation of the process of the fifth embodiment for guiding a user up to a place in which a further sufficient electric-field strength can be obtained.

FIG. 31 is a table, showing an example of electric-field strength information displayed on a display screen.

FIG. 32 is a block diagram, showing the configuration of a portable television-broadcast reception unit according to the sixth embodiment of the present invention.

FIG. 33 is a block diagram, showing the configuration of a portable television-broadcast reception unit according to the seventh embodiment of the present invention.

BEST MODE FOR IMPLEMENTING THE INVENTION

Hereinafter, a portable television-broadcast reception unit according to each embodiment of the present invention will be described with reference to the attached drawings.

First Embodiment

The reception quality of a television broadcast varies subtly according to the electric-field strength of an electronic radio wave received directly from a broadcast antenna, or an electronic radio wave received indirectly after reflected by a building or a mountain. Particularly, in terms of a portable terminal, in order for a user to view an image of the highest reception quality which can be obtained in the current position, the portable terminal's antenna-directivity direction has to be changed.

Figure 1:
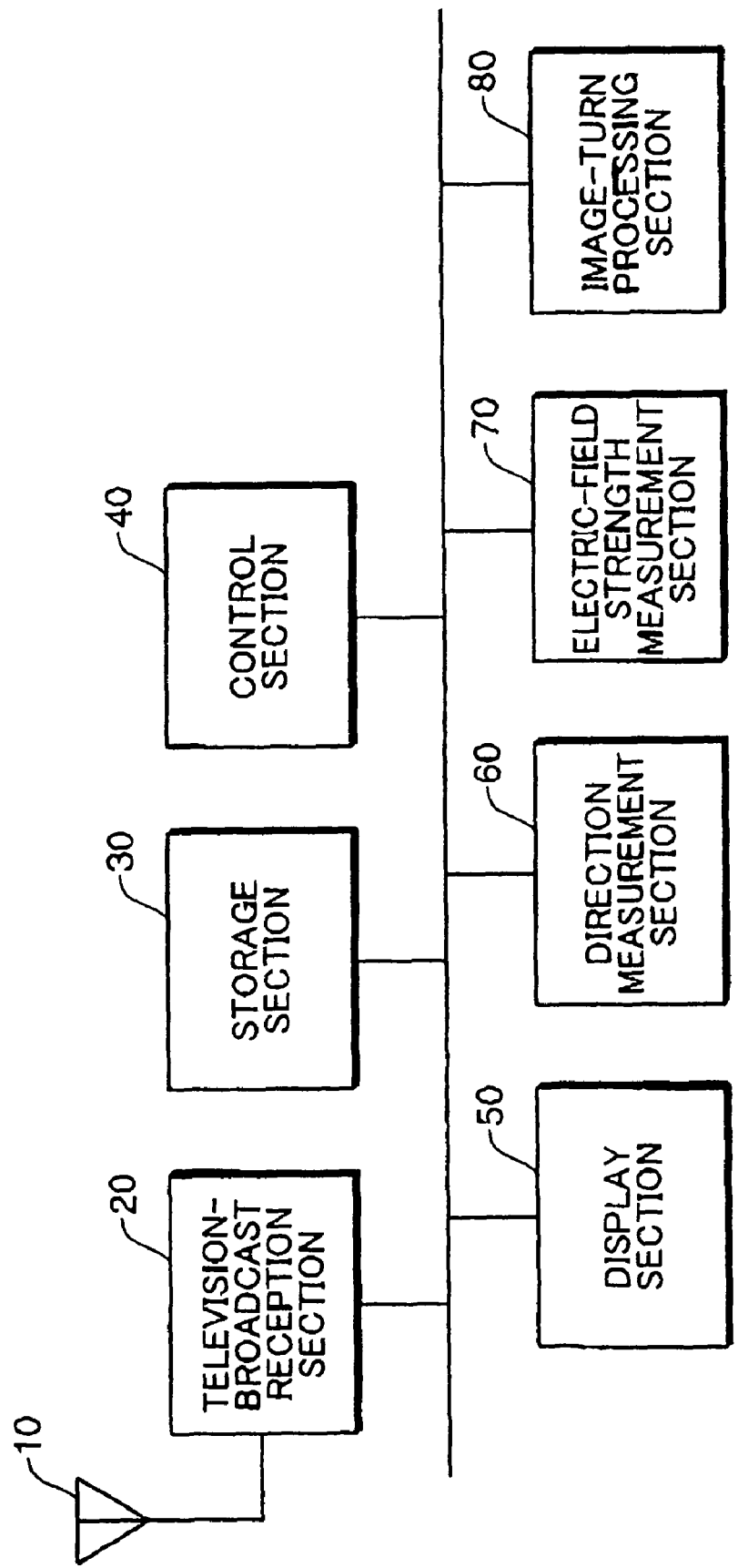
FIG. 1 is a block diagram, showing the configuration of a portable television-broadcast reception unit according to a first embodiment of the present invention.

FIG. 1 is a block diagram, showing the configuration of a portable television-broadcast reception unit according to a first embodiment of the present invention. The portable television-broadcast reception unit shown in FIG. 1 includes an antenna 10, a television-broadcast reception section 20, a storage section 30, a control section 40, a display section 50, a direction measurement section 60, an electric-field strength measurement section 70, and an image-turn processing section 80.

The antenna 10 receives a broadcast wave from a broadcast antenna. The television-broadcast reception section 20 demodulates a broadcast signal from a broadcast wave received by the antenna 10 and decodes broadcast data encoded from the broadcast signal. The electric-field strength measurement section 70 measures the electric-field strength of a broadcast wave received by the antenna 10. Besides, when the electric-field strength changes, the electric-field strength measurement section 70 notifies the control section 40 that such a change is made in the electric-field strength The direction measurement section 60 measures the direction of the antenna directivity of the portable television-broadcast reception unit. In addition, when a change is made in the antenna-directivity direction, the direction measurement section 60 notifies the control section 40 that the antenna-directivity direction has been changed. The storage section 30 holds measurement information including an electric-field strength and an antenna-directivity direction when the electric-field strength is measured which are constantly updated, as well as a threshold for deciding whether the electric-field strength will not cause any problem in television reception. This threshold can be varied, and thus, when a user changes the threshold, this change is accepted. Hence, the control section 40 may also change the threshold stored in the storage section 30 to the accepted threshold.

When receiving any of an electric-field strength change notification from the electric-field strength measurement section 70, a direction change notification from the direction measurement section 60 and a time-out notification by a timer which it controls on its own, the control section 40 acquires the electric-field strength from the electric-field strength measurement section 70. At the same time, it acquires the antenna-directivity direction when the electric-field strength is measured from the direction measurement section 60. Then, it updates information on the electric-field strength and the antenna-directivity direction when the electric-field strength is measured in the storage section 30, as well as the current antenna-directivity direction. Thereby, it decides on the antenna-directivity direction in which the maximum electric-field strength is obtained. The image-turn processing section 80 turns an image at a turn angle set by the control section 40. The display section 50 displays the image turned by the image-turn processing section 80.

The control section 40 is formed, for example, by a CPU (or central processing unit). It executes a television-broadcast reception program which is recorded in a computer-readable record medium, such as an ROM (or read only memory). Thereby, it controls each section of the portable television-broadcast reception unit.

In this embodiment, the television-broadcast reception section 20 corresponds to an example of the broadcast reception section; the direction measurement section 60, to an example of the direction measurement section; the electric-field strength measurement section 70, to an example of the quality measurement section; the storage section 30, to an example of the storage section; the control section 40, to an example of the control section and the change section; the image-turn processing section 80, to an example of the image turn section; and the display section 50, to an example of the display section.

The portable television-broadcast reception unit according to this embodiment is, for example, a portable communication terminal, such as a cellular phone. The portable television-broadcast reception unit may also be a PHS (or personal handy-phone system), a PDA (or personal data assistance), a portable video-game unit which has a communication function, a notebook personal computer which has a communication function, and the like.

Figure 2:
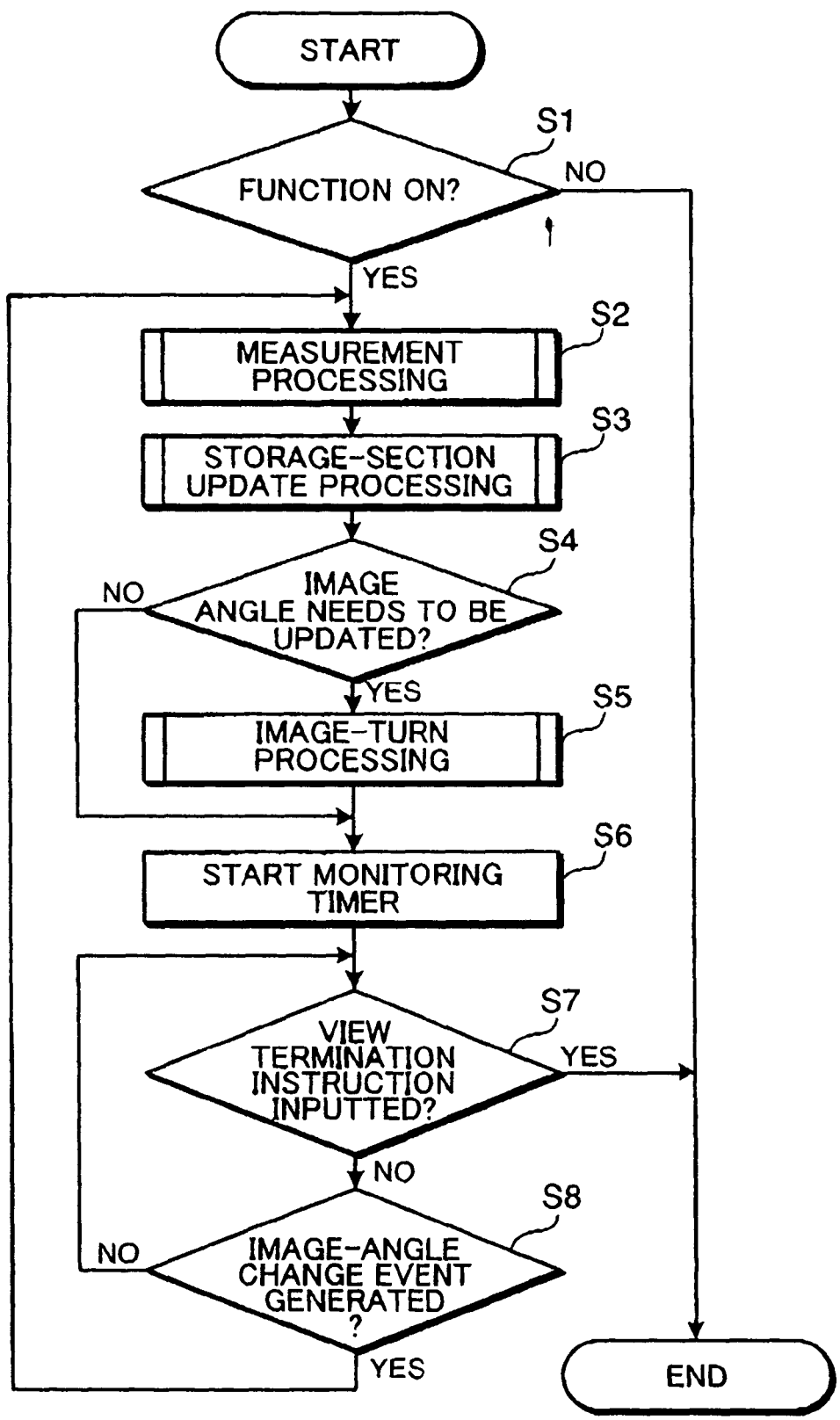
FIG. 2 is a flow chart, showing the operation of a control section according to the present invention.

FIG. 2 is a flow chart, showing the operation of the control section 40 according to the present invention. First, when television starts to be watched, the control section 40 refers to a function-ON flag and decides whether or not the function-ON flag is turned on (in a step S1). The decision is made whether or not the function-ON flag is turned on, so that a decision is made whether or not the control according to the present invention should be executed. The function-ON flag is a flag for deciding whether or not an image should be turned and displayed according to the present invention. It is set through an operation by a user, or another such operation. If the decision is made that the function-ON flag is turned off (NO at the step S1), the processing is terminated.

On the other hand, if the decision is made that the function-ON flag is turned on (YES at the step S1), the control section 40 executes a measurement processing for measuring a direction of the antenna directivity and an electric-field strength (in a step S2). Incidentally, the details of such a measurement processing are described later. Next, based on the result of the measurement processing, the control section 40 executes a storage-section update processing for updating the contents stored in the storage section 30 (in a step S3). The details of such a storage-section update processing are described later. Next, the control section 40 decides whether or not the angle of an image displayed on the screen of the display section 50 needs to be updated (in a step S4).

Herein, if the decision is made that the image angle needs to be updated (YES at the step S4), the control section 40 executes an image turn processing for turning the image (in a step S5). The image turn processing is executed when an image-angle update flag in an electric-field strength management table described later is turned on. Specifically, in the step S4, if the image-angle update flag is turned on, the control section 40 decides that the image angle needs to be updated. On the other hand, if the image-angle update flag is turned off, the control section 40 decides there is no need to update the image angle. Incidentally, the details of such an image turn processing are described later.

After the image turn processing is executed, or if the decision is made that there is no need to update the image angle (NO at the step S4), the control section 40 starts to operate a monitoring timer (in a step S6) and waits for an image-angle change event to take place. Next, the control section 40 decides whether or not a view termination instruction is inputted (in a step S7). When the view is terminated, an input section accepts the view termination instruction given by a user. Then, it outputs this view termination instruction to the control section 40. Herein, if the decision is made that the view termination instruction has been inputted (YES at the step S7), the processing is terminated.

On the other hand, if the decision is made that the view termination instruction is not inputted (NO at the step S7), the control section 40 decides whether or not an image-angle change event has been produced (in a step S8). Herein, if the decision is made that no image-angle change event has been produced (NO at the step S8), the processing returns to the step S7. Then, it is kept on standby until a view termination instruction is inputted, or until an image-angle change event is produced. While waiting for an image-angle change event to take place, if the decision is made that an image-angle change event has occurred, in other words, if a time-out notification of the monitoring timer, a change notification of the electric-field strength or a change notification of the antenna-directivity direction is received (YES at the step S8), the processing returns to the step S2. Then, the control section 40 starts the measurement processing.

In this way, a broadcast wave is received by the directional antenna 10. In the storage section 30, an electric-field strength management table is stored which includes the direction of the directional antenna 10 and the electric-field strength value of the broadcast wave received by the directional antenna 10. The direction measurement of the directional antenna 10 and the electric-field strength measurement are controlled. Then, the electric-field strength management table stored in the storage section 30 is updated, and the direction in which the maximum electric-field strength value can be obtained is selected. Then, a received image is turned so that the upper part of the image is oriented to the selected direction in which the maximum electric-field strength value is obtained. Finally, the turned image is displayed.

Therefore, the upper part of a displayed image coincides with the direction in which the maximum electric-field strength value can be obtained. This helps lead the direction of the directional antenna 10 toward the image's upper part. Thereby, the directional antenna 10's direction can be easily changed to a direction where an enough electric-field strength to watch television is obtained.

Herein, the measurement processing of the step S2 in FIG. 2 will be described. FIG. 3 is a flow chart, showing the measurement processing in the step S2 of FIG. 2. First, the control section 40 acquires an antenna-directivity direction from the direction measurement section 60 (in a step S11). Next, the control section 40 acquires an electric-field strength from the electric-field strength measurement section 70 (in a step S12). The direction measurement section 60 has two magneto-sensitive axes of an X-axis and a Y-axis. Specifically, magnetic sensors are provided in the X-axis direction and the Y-axis direction which are perpendicular to each other, so that an angle is measured to geomagnetism. Thus, the direction measurement section 60 is disposed so that the X-axis and the Y-axis are parallel to a plane for searching for antenna directivity. Hence, when a user operates a reception terminal according to the present invention, desirably, the user should hold such sensors in such a posture that their sensitivity becomes higher.

Figures 4A, 4B:
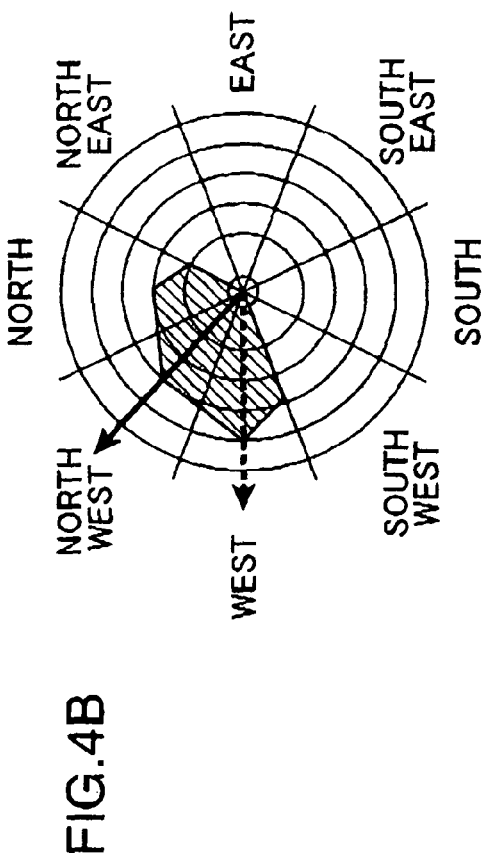
FIG. 4 is a representation, showing an electric-field strength management table.

Next, the electric-field strength management table stored in the storage section 30 will be described. FIG. 4 is a representation, showing such an electric-field strength management table. FIG. 4A shows an example of the electric-field strength management table. FIG. 4B represents an electric-field strength in the electric-field strength management table shown in FIG. 4A. Incidentally, in FIG. 4B, the solid-line arrow indicates the direction of a directional antenna, and the dashed-line arrow indicates the direction in which the electric-field strength comes to the maximum.

An electric-field strength management table 400 is stored in the storage section 30 of FIG. 1 and is managed by the control section 40. In a direction 401 of the electric-field strength management table 400, an antenna-directivity direction is stored which is measured by the direction measurement section 60. In the direction 401, the north is zero degrees, each direction is 45 degrees, and the direction is managed to one decimal place. In an electric-field strength 402, an electric-field strength is stored in the antenna-directivity direction measured by the electric-field strength measurement section 70. In direction information 403, there are stored the current antenna-directivity direction and the antenna-directivity direction in which the maximum electric-field strength can be obtained. In an image-angle update flag, in the storage-section update processing, if the electric-field strength is changed in the current antenna directivity, or if the antenna-directivity direction is changed, then a flag is stored for deciding whether the angle of a displayed image needs to be changed.

Figure 5:
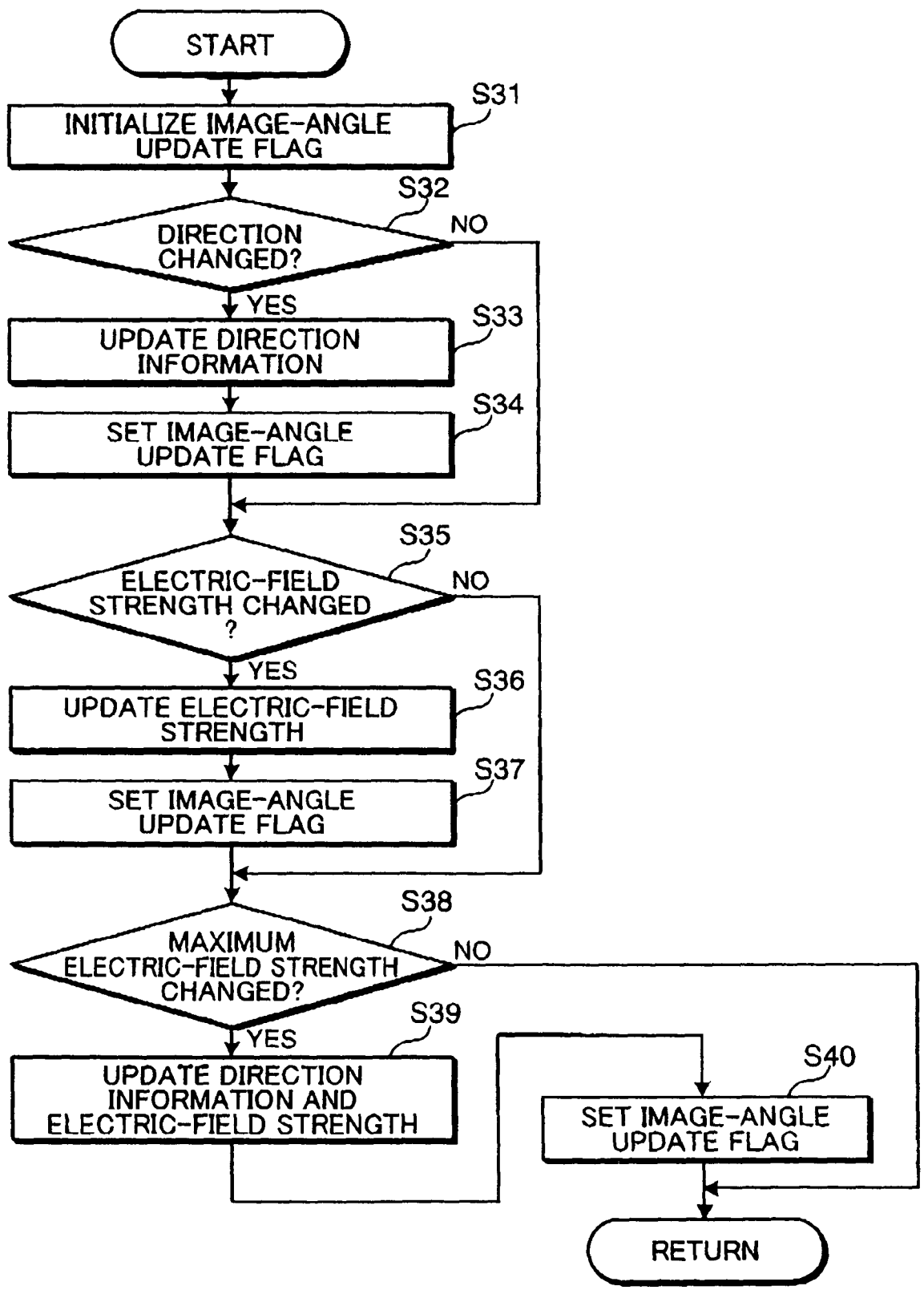
FIG. 5 is a flow chart, showing a storage-section update processing in the step S3 of FIG. 2.

Next, the storage-section update processing of the step S3 in FIG. 2 will be described. FIG. 5 is a flow chart, showing the storage-section update processing in the step S3 of FIG. 2. First, the control section 40 initializes an image-angle update flag 404 of the electric-field strength management table stored in the storage section 30 to "update unnecessary" (in a step S31). Next, the control section 40 compares the current antenna-directivity direction acquired from the direction measurement section 60 and the current antenna-directivity direction stored in the direction information 403 of the electric-field strength management table. Then, the control section 40 decides whether or not the current antenna-directivity direction has been changed (in a step S32).

If the decision is made that the antenna-directivity direction has been changed (YES at the step S32), the control section 40 updates the direction information 403 of the electric-field strength management table to the current antenna-directivity direction acquired from the direction measurement section 60 (in a step S33). Next, the control section 40 sets the image-angle update flag 404 of the electric-field strength management table to "update necessary" (in a step S34).

After the image-angle update flag is set, or if the decision is made that the antenna-directivity direction has not been changed (NO at the step S32), the control section 40 compares the electric-field strength in the current antenna directivity acquired from the electric-field strength measurement section 70 and the electric-field strength 402 in the current antenna-directivity direction stored in the electric-field strength management table. Then, the control section 40 decides whether or not the electric-field strength has been changed (in a step S35).

If the decision is made that the electric-field strength has been changed (YES at the step S35), the control section 40 updates the electric-field strength 402 in the current antenna directivity of the electric-field strength management table (in a step S36). Next, the control section 40 sets the image-angle update flag 404 of the electric-field strength management table to "update necessary" (in a step S37).

After the image-angle update flag is set, or if the decision is made that the electric-field strength has not been changed (NO at the step S35), the control section 40 compares the electric-field strength acquired from the electric-field strength measurement section 70 and the electric-field strength 402 in the antenna-directivity direction in which the maximum electric-field strength can be obtained in the direction information 403 stored in the electric-field strength management table. Then, the control section 40 decides whether or not the maximum electric-field strength has been changed (in a step S38). If the decision is made that the maximum electric-field strength has not been changed (NO at the step S38), the storage-section update processing is terminated.

If the decision is made that the maximum electric-field strength has been changed (YES at the step S38), the control section 40 updates the antenna-directivity direction in which the maximum electric-field strength can be obtained in the direction information 403 of the electric-field strength management table, and simultaneously, it updates the electric-field strength 402 which corresponds to this direction (in a step S39). Next, the control section 40 sets the image-angle update flag 404 of the electric-field strength management table to "update necessary" (in a step S40). Then, the storage-section update processing is terminated.

Herein, a variation of an example in which the storage-section update processing is implemented will be described below. In the case where the condition that the image-angle update flag of the electric-field strength management table should be set to "update necessary" is changed, an implementation example is given in the following.

In the step S34 and the step S37 of FIG. 5, the processing for setting an image-angle update flag may also be omitted. In that case, only the processing for setting an image-angle update flag in the step S40 is practiced. Specifically, if the maximum electric-field strength is changed, the image-angle update flag 404 of the electric-field strength management table is set to "update necessary". Thereby, only in the case where the maximum electric-field strength is varied, the angle of a displayed image can be changed.

In the same way, only the processing for setting an image-angle update flag in the step S37 of FIG. 5 may also be omitted. Then, the processing for setting an image-angle update flag in the step S34 and the step S40 can be practiced. Specifically, if the maximum electric-field strength or the direction of antenna directivity is changed, the image-angle update flag 404 of the electric-field strength management table is set to "update necessary". This makes it possible to vary the condition that the angle of a displayed image should be changed.

Figure 6:
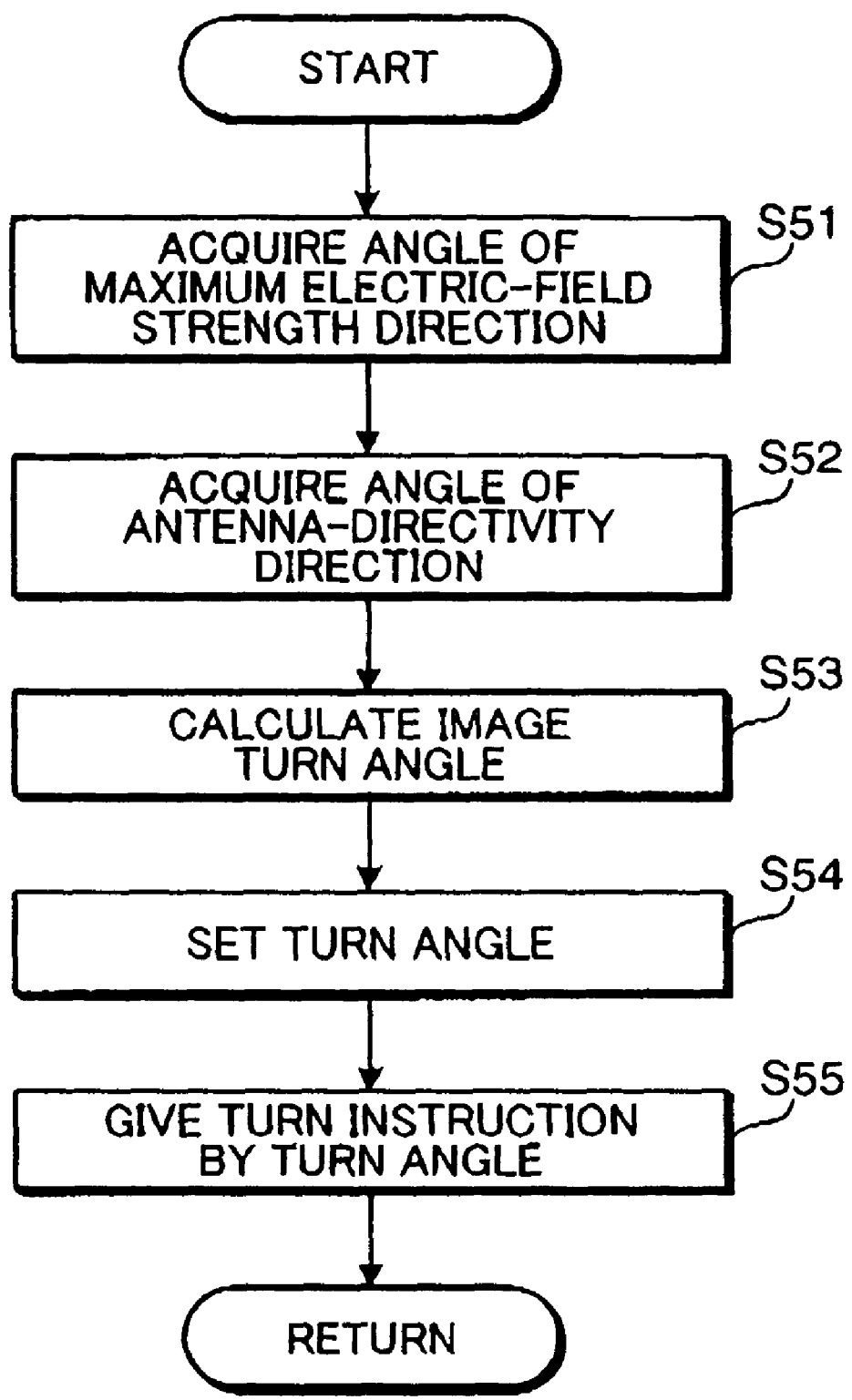
FIG. 6 is a flow chart, showing an image turn processing in the step S5 of FIG. 2.

Next, the image turn processing of the step S5 in FIG. 2 will be described. FIG. 6 is a flow chart, showing the image turn processing in the step S5 of FIG. 2. The control section 40 of FIG. 1 sets an image turn angle in the image-turn processing section 80 and sets an image turn instruction in the image-turn processing section 80. Thereby, the display section 50 displays a turned image. The image-turn processing section 80 turns the image by the turn angle which has been set by the control section 40.

The angle by which an image is turned is expressed by the angle left when the angle of the direction of antenna directivity is subtracted from the angle of the direction where the electric-field strength becomes the maximum. The angle has a unit of one-360th degrees as its precision. The exact north is set at zero degrees, and the counterclockwise angle is positive. The image-turn processing section 80 can also set a negative turn angle, and the control section 40 sets such a negative turn angle using the complement representation of two. The flow chart of FIG. 6 shows a flow of the control section 40's image turn processing.

First, the control section 40 acquires the angle of the direction where the electric-field strength is the maximum from the electric-field strength management table shown in FIG. 4 (in a step S51). Next, the control section 40 acquires the angle of the antenna-directivity direction in the current position from the electric-field strength management table (in a step S52). Sequentially, the control section 40 subtracts the angle of the current antenna-directivity direction from the angle of the direction in which the electric-field strength becomes the maximum. Thereby, it calculates an image turn angle (in a step S53). After calculating the image turn angle, the control section 40 sets this turn angle in the image-turn processing section 80 (in a step S54). Next, the control section 40 outputs, to the image-turn processing section 80, an instruction to turn the image by the turn angle (in a step S55). Upon receiving the instruction from the control section 40, the image-turn processing section 80 executes an image turn display by the corresponding turn angle.

If the turn angle is set to an angle other than zero degrees, then the image-turn processing section 80 keeps a reduced scale factor for an image at a fixed value, so that it is located within the display screen. Then, it executes the image's turn display. For example, if the length-width ratio is 4:3 at a turn angle of zero degrees, the reduced scale factor is set to 60%, and then, a turn display is made at the turn angle set by the control section 40. Or, the image-turn processing section 80 may also execute a turn display by changing the display mode. If the turn angle is 0 degrees, 90 degrees, 180 degrees and 270 degrees, then the reduced scale factor is set to 100%, 75%, 100% and 75%. If the turn angle is an angle other than those, then a turn display is made at a reduced scale factor of 60%.

As described above, when an image is turned, its size is reduced so that the entire image is within the display screen of the display section. Therefore, the upper part of the image is certainly displayed within the display screen. This helps recognize the image's upper part easily.

Figure 7:
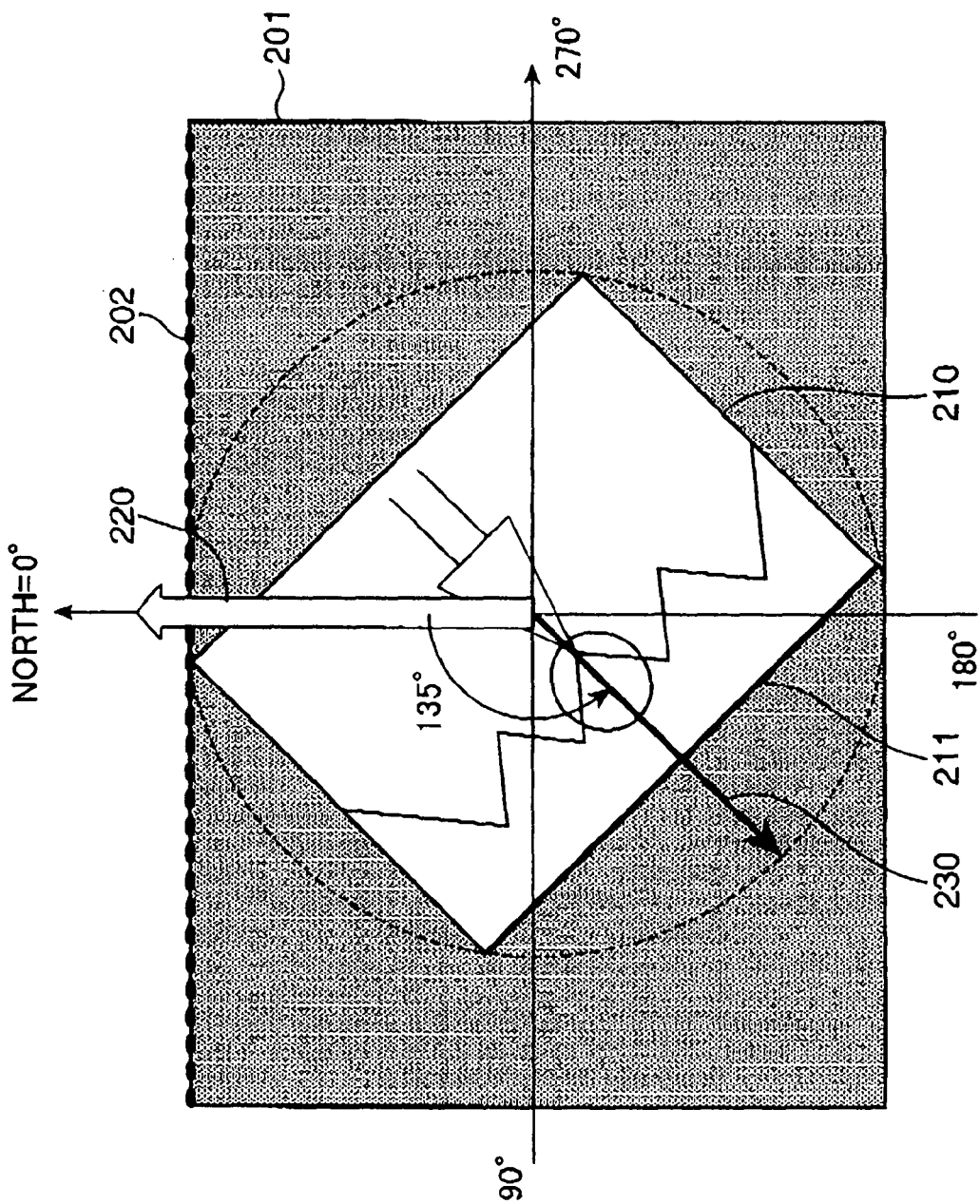
FIG. 7 is a representation, showing a display example of an image displayed on a display screen.

Herein, an image displayed on a display screen will be described. FIG. 7 is a representation, showing a display example of the image displayed on the display screen. FIG. 7 shows a display example of an image 210 on a display screen 201 when the direction of antenna directivity is at zero degrees and the direction in which the electric-field strength becomes the maximum is at 135 degrees. An arrow 220 indicates the antenna-directivity direction, and an arrow 230 points the direction of the maximum electric-field strength.

In this case, the angle by which the image 210 is turned becomes 135 degrees. Hence, the image 210 is turned and displayed at 135 degrees with respect to the direction of an upper part 202 of the display screen 201. The upper part 202 of the display screen 201 expresses the antenna-directivity direction, and an upper part 211 of the display image 210 represents the direction of the maximum electric-field strength. The antenna-directivity direction is the direction where a user who carries the portable television-broadcast reception unit can view the display screen 201 straight. It is the direction perpendicular to the upper part 202 of the display screen 201.

The monitoring-timer start processing in the step S6 of FIG. 2 is executed to constantly update information on the electric-field strength and information on the antenna-directivity direction in the electric-field strength management table stored in the storage section 30 inside of the portable television-broadcast reception unit. The control section 40 is provided with its internal timer. It starts to operate the timer, and in the timing when the timer executes a time-out, it acquires information from the electric-field strength measurement section 70 and the direction measurement section 60. Then, it updates the electric-field strength management table.

In the electric-field strength management table of FIG. 4, the direction 401 and the direction information 403 each have a unit of one-3600th degrees as its precision the exact north is set at zero degrees, and the counterclockwise angle is positive. Further, the direction of the one-3600th degrees precision is divided Into eight. Hence, the range from 247.5 degrees to 292.4 degrees is set as the east; the range from 157.5 degrees to 202.4 degrees, as the south: the range from 67.5 degrees to 112.4 degrees, as the west; the range from 337.5 degrees to 22.4 degrees, as the north: the range from 202.5 degrees to 247.4 degrees, as the southeast; the range from 112.5 degrees to 157.4 degrees, as the southwest; the range from 22.5 degrees to 67.4 degrees, as the northwest; and the range from 292.5 degrees to 337.4 degrees, as the northeast.

The electric-field strength 402 is managed in the unit of dB (or decibel). The electric-field strength in directions which are not yet acquired is designed to be the minimum negative value.

Figures 8A, 8B:
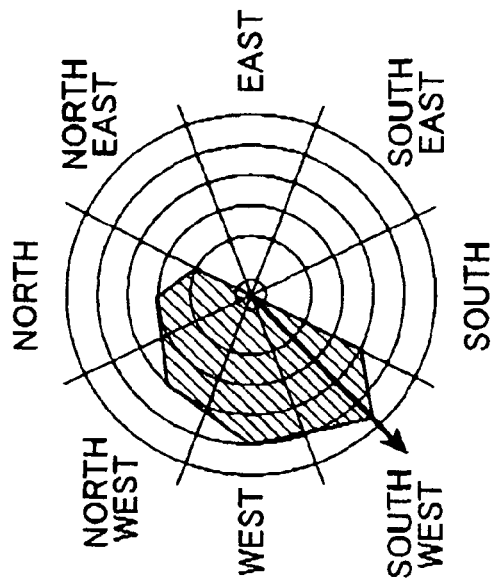
FIG. 8 is a representation, showing an electric-field strength management table in the case where a change is made in the direction of antenna directivity.

FIG. 8 is are presentation, showing an electric-field strength management table in the case where a change is made in the direction of antenna directivity. FIG. 8A shows an example of the electric-field strength management table, and FIG. 8B expresses the electric-field strength in the electric-field strength management table shown in FIG. 8A. In FIG. 8B, the solid-line arrow indicates the direction of a directional antenna, and the broken-line arrow indicates the direction in which the electric-field strength comes to the maximum.

In FIG. 8, in the portable television-broadcast reception unit, if the antenna-directivity direction is changed from the northwest to the southwest, the electric-field strength management table is updated. An electric-field strength management table 410 represents the electric-field strength management table after updated. At this time, in the direction information 403, the direction in which the maximum electric-field strength is rewritten from the west to the southwest. Then, the antenna-directivity direction of the direction information 403 is rewritten from the northwest to the southwest, and the southwest electric-field strength of the electric-field strength 402 is rewritten from 50 [dB] to 65 [dB].

Herein, an update sequence of an electric-field strength management table will be described. FIG. 9 is a representation, showing the update sequence in which the electric-field strength management table is updated.

First, for a period 801 of FIG. 9, the case where the electric-field strength management table is updated based on a time-out notification in the timer started by the control section 40. When the monitoring timer started by the control section 40 executes a time-out, it transmits the time-out notification to the control section 40. Upon receiving the time-out notification, the control section 40 transmits an information acquisition request to the direction measurement section 60 and the electric-field strength measurement section 70. On receiving the information acquisition request, the direction measurement section 60 and the electric-field strength measurement section 70 transmits information on the antenna-directivity direction and information on the electric-field strength to the control section 40. The control section 40 acquires the information on the antenna-directivity direction and the information on the electric-field strength from the direction measurement section 60 and the electric-field strength measurement section 70. Then, it updates the electric-field strength management table in the storage section 30. Sequentially, the control section 40 starts to operate the monitoring timer so that the next update timing can be created.

Next, for a period 802 of FIG. 9, the case where the electric-field strength management table is updated based on a direction change notification from the direction measurement section 60. The control section 40 starts to operate the monitoring timer, and before a time-out takes place, the direction change notification is transmitted to the control section 40 from the direction measurement section 60. Upon receiving the direction change notification, the control section 40 stops the monitoring timer. Then, it transmits an information acquisition request to the direction measurement section 60 and the electric-field strength measurement section 70. On receiving the information acquisition request, the direction measurement section 60 and the electric-field strength measurement section 70 transmits information on the antenna-directivity direction and information on the electric-field strength to the control section 40. The control section 40 acquires the information on the antenna-directivity direction and the information on the electric-field strength from the direction measurement section 60 and the electric-field strength measurement section 70. Then, it updates the electric-field strength management table in the storage section 30. Sequentially, the control section 40 starts to operate the monitoring timer so that the next update timing can be created.

Next, for a period 803 of FIG. 9, the case where the electric-field strength management table is updated based on an electric-field strength change notification from the electric-field strength measurement section 70. The control section 40 starts to operate the monitoring timer, and before a time-out takes place, the electric-field strength change notification is transmitted to the control section 40 from the electric-field strength measurement section 70. Upon receiving the electric-field strength change notification, the control section 40 stops the monitoring timer. Then, it transmits an information acquisition request to the direction measurement section 60 and the electric-field strength measurement section 70. On receiving the information acquisition request, the direction measurement section 60 and the electric-field strength measurement section 70 transmits information on the antenna-directivity direction and information on the electric-field strength to the control section 40. The control section 40 acquires the information on the antenna-directivity direction and the information on the electric-field strength from the direction measurement section 60 and the electric-field strength measurement section 70. Then, it updates the electric-field strength management table in the storage section 30. Sequentially, the control section 40 starts to operate the monitoring timer so that the next update timing can be created.

In this way, when a change is detected in the direction of the directional antenna 10, a direction change notification is outputted. On the other hand, when a change is detected in the electric-field strength value, an electric-field strength change notification is outputted. Then, if every time a specific time passes, the direction change notification is inputted or if the electric-field strength change notification is inputted, the measurement of a direction and the measurement of an electric-field strength are controlled.

Therefore, every time a specific time elapses, if the direction of the directional antenna 10 is changed or if the electric-field strength value is changed, the direction measurement and the electric-field strength measurement are controlled. Thereby, the newest electric-field strength management table can always be stored, thus maintaining a good reception quality constantly.

Figure 10:
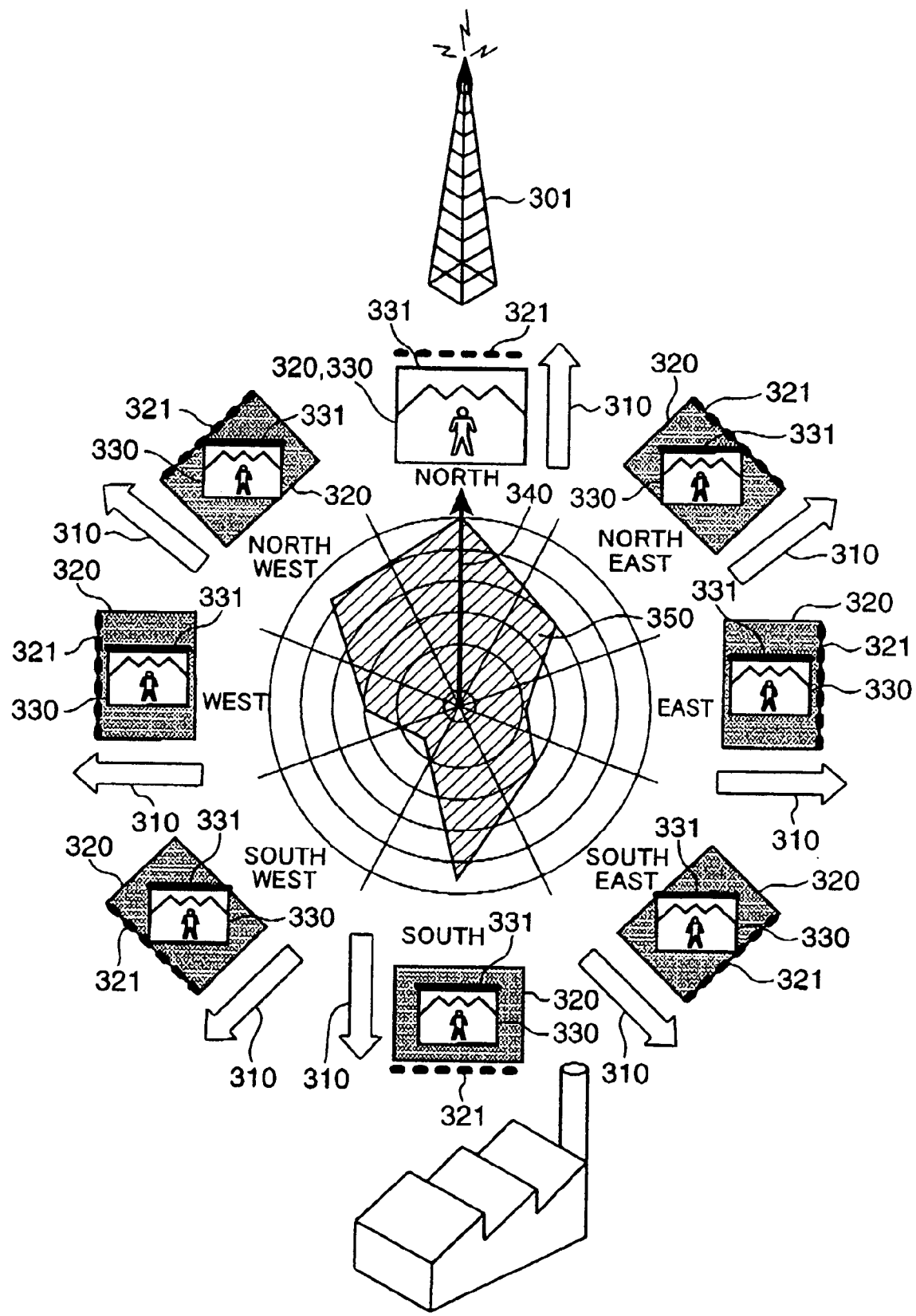
FIG. 10 is a representation, showing a display example of variations in the angle of an image when a user is guided so that the direction of antenna directivity is oriented to the direction where the maximum electric-field strength is obtained.

FIG. 10 is a representation, showing a display example of variations in the angle of an image when a user is guided so that the direction of antenna directivity is oriented to the direction where the maximum electric-field strength is obtained. In FIG. 10, the user stays at the center of a circle, and a broadcast antenna 301 is located on the exact north of the user. The antenna-directivity direction shown by an arrow 310 coincides with an upper part 321 of a display screen 320. An arrow 340 indicates the direction in which the electric-field strength becomes the maximum. In the example of FIG. 10, it points to the north. An obliquely hatched area 350 represents the electric-field strength. When the antenna-directivity direction turns to the north, the northeast, the east, the southeast, the south, the southwest, the west and the northwest, an upper part 331 of an image 330 displayed on the display screen 320 is oriented to the north where the electric-field strength becomes the maximum. If the antenna-directivity direction turns to the direction of the broadcast antenna 301 where the maximum electric-field strength is obtained, the image 330 is displayed at a turn angle of zero degrees on the display screen 320.

Figure 11:
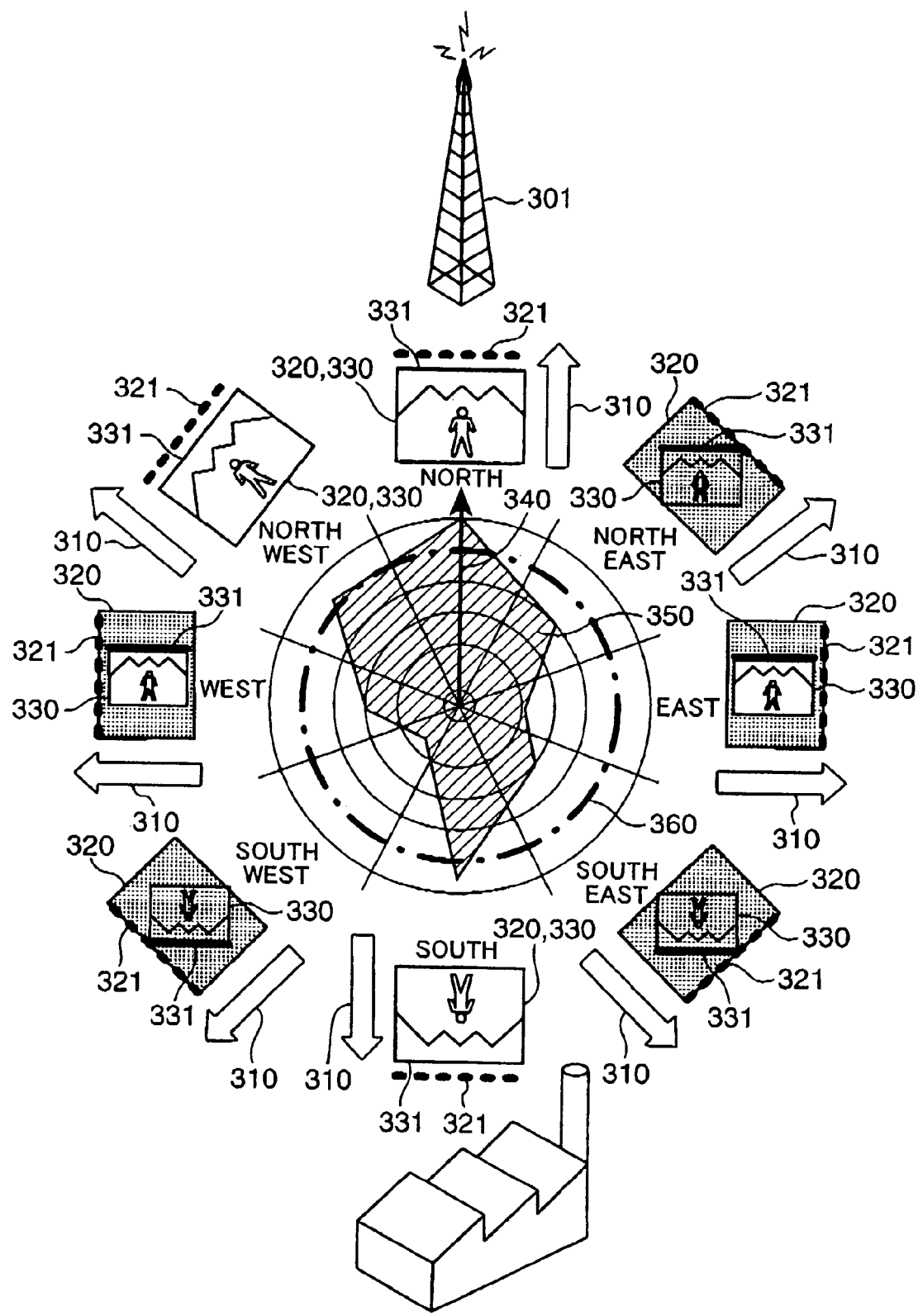
FIG. 11 is a representation, showing a display example of a change in the angle of an image when a user is guided so that the direction of antenna directivity is oriented to the direction where the electric-field strength becomes equal to, or above, a predetermined threshold value.

In addition, FIG. 11 is a representation, showing a display example of a change in the angle of an image when a user is guided so that the direction of antenna directivity is oriented to the direction where the electric-field strength becomes equal to, or above, a predetermined threshold value. In FIG. 11, the user stays at the center of a circle, and a broadcast antenna 301 is located on the exact north of the user. The antenna directivity direction shown by an arrow 310 coincides with an upper part 321 of a display screen 320. An arrow 340 indicates the direction in which the electric-field strength becomes the maximum. In the example of FIG. 11, it points to the north. An obliquely hatched area 350 represents the electric-field strength and a one-pointed chain line 360 expresses the threshold value of the electric-field strength. In FIG. 11, in the portable television-broadcast reception unit, if the direction of a directional antenna turns to the north, the electric-field strength comes to the maximum. However, in terms of the direction where the electric-field strength equal to, or above, the predetermined threshold value is obtained, an image turn processing is not executed. Hence, even in terms of the northwest and the south, the electric-field strength is equal to, or above, the predetermined threshold value, and thus, an image 330 is displayed at a normal image angle. In contrast, in terms of directions other than the ones where the predetermined threshold value is obtained, with the upper part of the displayed image 330 kept oriented to the north which is the direction of the maximum electric-field strength, it is displayed at a changed image angle.

As described above, a decision is made whether or not the electric-field strength value which corresponds to the current direction of the directional antenna 10 is equal to, or above, a threshold value. If the decision is made that the electric-field strength value is equal to, or above, the threshold value, a received image is displayed with remaining unturned. Therefore, if the electric-field strength value is equal to, or above, the threshold value, in other words, if a good reception quality can be obtained, then a television broadcast can be viewed without changing the direction of a directional antenna.

Furthermore, the control section 40 selects a direction where an electric-field strength value which is equal to, or above, a threshold value is obtained. If there are several directions in which the electric-field strength value becomes equal to, or above, the threshold value, then the direction in which the turn angle from the above described directional antenna at present becomes the minimum may also be chosen from among the several directions. In this way, a direction is chosen in which an electric-field strength value equal to, or above, the threshold value can be obtained. Then, if there are several directions in which the electric-field strength value becomes equal to, or above, the threshold value, then the direction in which the turn angle from the directional antenna 10 at present becomes the minimum is chosen from among the several directions. This makes it possible to change the directional antenna 10's direction quickly. For example, in FIG. 11, if the antenna 10 is oriented to the southeast, the control section 40 selects the south where the turn angle comes to the minimum. Thus, all a user has to do is to change the antenna 10's direction by some 45 degrees.

Figure 12:
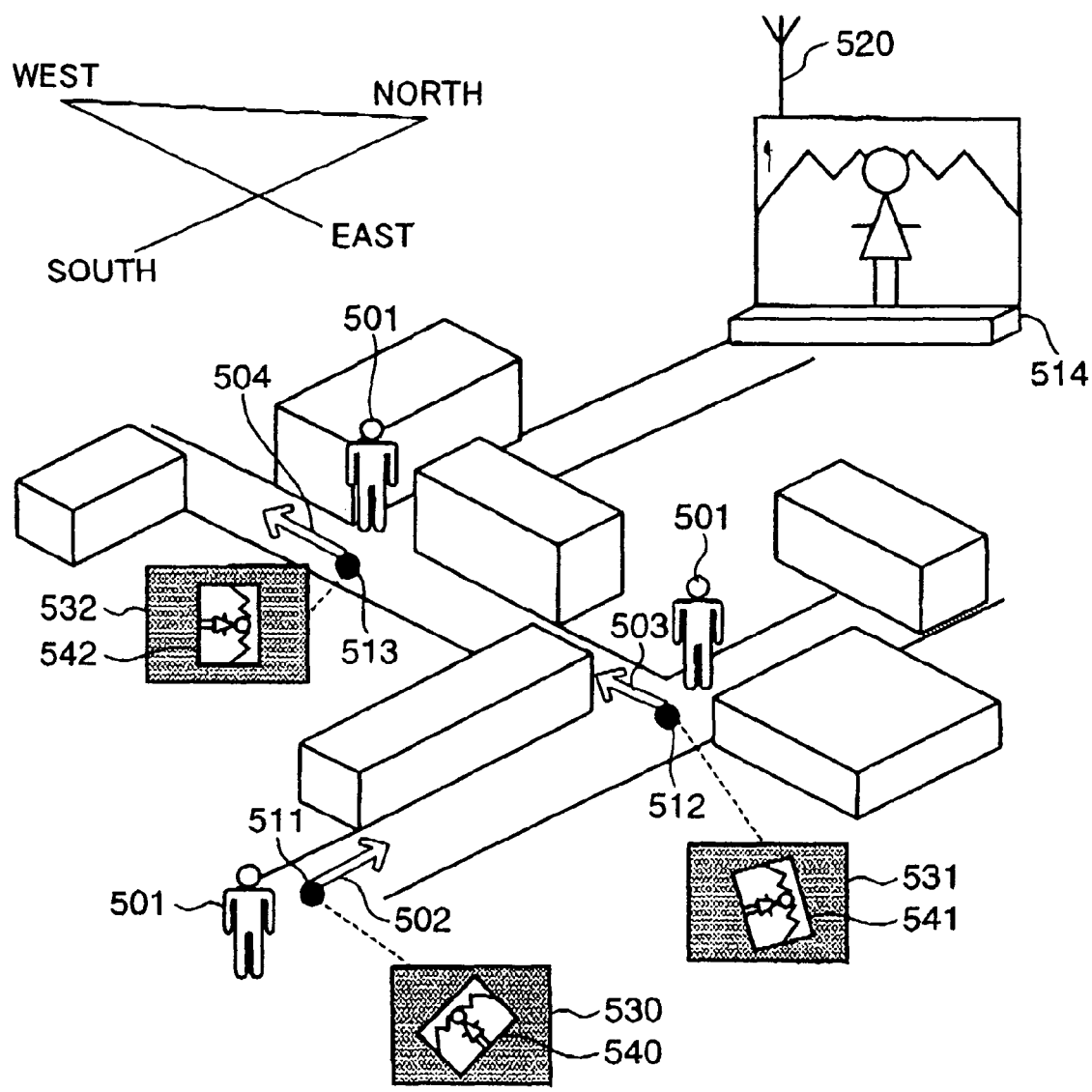
FIG. 12 is a representation, showing an example of the process for guiding a pedestrian to a destination using a portable television-broadcast reception unit.

The portable television-broadcast reception unit according to the present invention can also be used, without using a GPS (or global positioning system), as a navigator for guiding pedestrians to their destinations in the grounds of an event or in another such place. Hence, such a case that the portable television-broadcast reception unit is used for navigation which leads a pedestrian to a destination will be described using FIG. 12. FIG. 12 is a representation, showing an example of the process for guiding the pedestrian to the destination using the portable television-broadcast reception unit.

The portable television-broadcast reception unit guides a pedestrian 501 to a destination 514 from a current point 511 which is a starting point. In the destination 514, a broadcast antenna 520 is placed, and the portable television-broadcast reception unit receives a television broadcast transmitted from this broadcast antenna 520.

First, the pedestrian 501 who carries the portable television-broadcast reception unit according to the present invention makes one turn of the portable television-broadcast reception unit at the current point 511 as the starting point. Thereby, the directional antenna is turned once, so that the electric-field strength management table is updated. At the current point 511, the directional antenna's direction is on the north, as shown by an arrow 502. At this time, the direction in which the pedestrian 501 goes forward is the same as the directional antenna's direction. The broadcast antenna 520 is located ahead on the left of the pedestrian 501's walking direction. Thereby, at the current point 511, an image 540 shown in FIG. 12 is displayed on a display screen 530 of the portable television-broadcast reception unit. Thus, the pedestrian 501 can walk toward the north along the street.

The pedestrian 501 who reaches a current point 512 makes one full turn of the directional antenna to update the electric-field strength management table. At the current point 512, the directional antenna's direction is on the west, as shown by an arrow 503. At this time, the direction in which the pedestrian 501 goes forward is the same as the directional antenna's direction. The broadcast antenna 520 is located ahead on the right of the pedestrian 501's walking direction. Thereby, at the current point 512, an image 541 is displayed on a display screen 531 of the portable television-broadcast reception unit. Thus, the pedestrian 501 can walk toward the west along the street.

Similarly, the pedestrian 501 who reaches a current point 513 turns the directional antenna once to update the electric-field strength management table. At the current point 513, the directional antenna's direction is on the west, as shown by an arrow 504. At this time, the direction in which the pedestrian 501 goes forward is the same as the directional antenna's direction. The broadcast antenna 520 is located on the right-hand side of the pedestrian 501's walking direction. Thereby, at the current point 513, an image 542 is displayed on a display screen 532 of the portable television-broadcast reception unit. Thus, the pedestrian 501 can walk toward the north along the street to arrive at the destination 514 where the broadcast antenna 520 stands.

Incidentally, in this embodiment, the portable television-broadcast reception unit includes a single directional antenna. However, the present invention is not limited especially to this, and thus, a plurality, for example, two directional antennas perpendicular to each other, may also be provided.

Second Embodiment

Next, a portable television-broadcast reception unit according to a second embodiment of the present invention will be described. In the first embodiment, the information on the electric-field strength and the information on the directional antenna's direction which are held in the electric-field strength management table of the storage section 30 will be held in the electric-field strength management table until such information is acquired again so that the information can be rewritten. Therefore, for example, if a user moves or if the electric-field strength changes largely, then wrong, old information can be displayed and offered to the user. Hence, in the second embodiment, a clock and a GPS are added to the configuration of the first embodiment. This helps delete information which is judged to have become invalid from the storage section 30.

Figure 13:
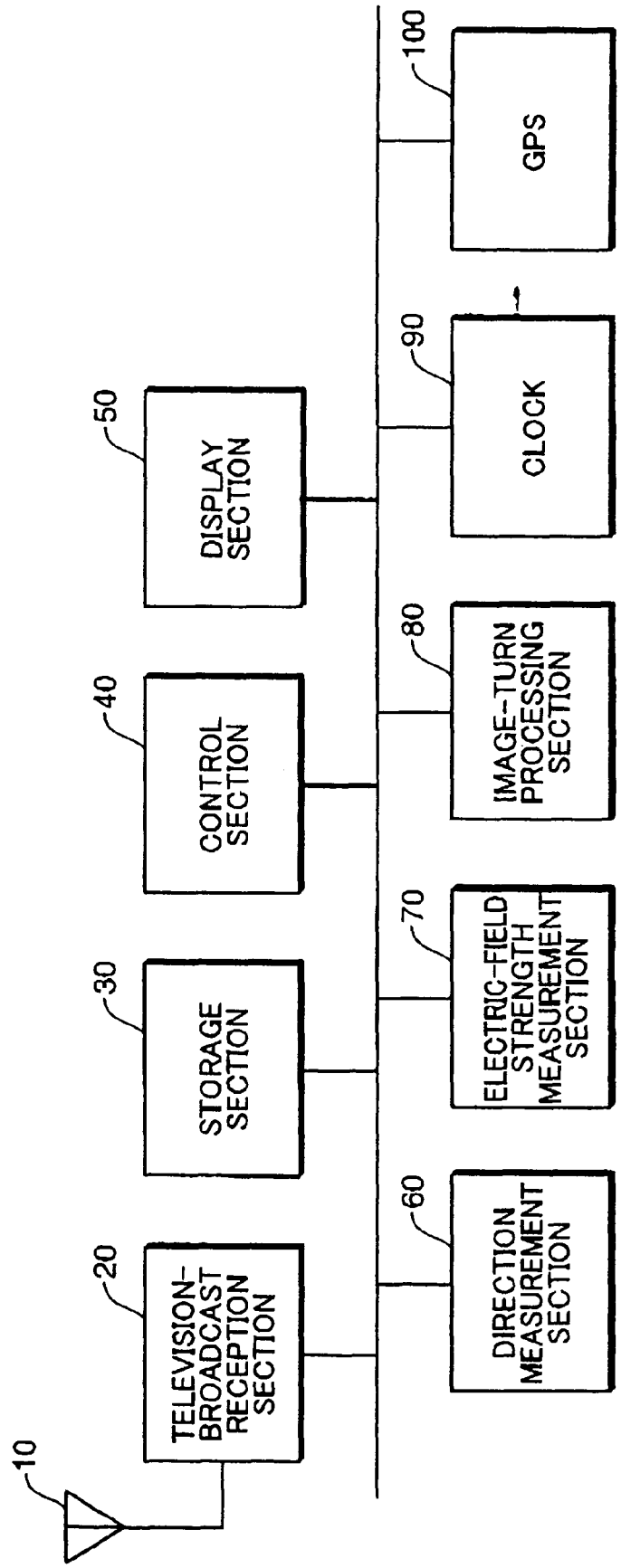
FIG. 13 is a block diagram, showing the configuration of a portable television-broadcast reception unit according to a second embodiment of the present invention.

FIG. 13 is a block diagram, showing the configuration of the portable television-broadcast reception unit according to the second embodiment of the present invention. The portable television-broadcast reception unit shown in FIG. 13 is configured by adding a clock 90 and a GPS 100 to the configuration of the first embodiment shown in FIG. 1. The clock 90 clocks the current time in the form of year, month, day and hour, minute, second. The GPS 100 takes information on the current position in the form of latitude and longitude. In this embodiment, the clock 90 corresponds to an example of the clock section, and the GPS 100 corresponds to an example of the position measurement section.

In this embodiment, the flow of a processing is the same as the flow chart of the first embodiment shown in FIG. 2. However, the former is different from the latter in the measurement processing of the step S2 and the storage-section update processing of the step S3. The processing different from that of the first embodiment will be described below.

Figure 14:
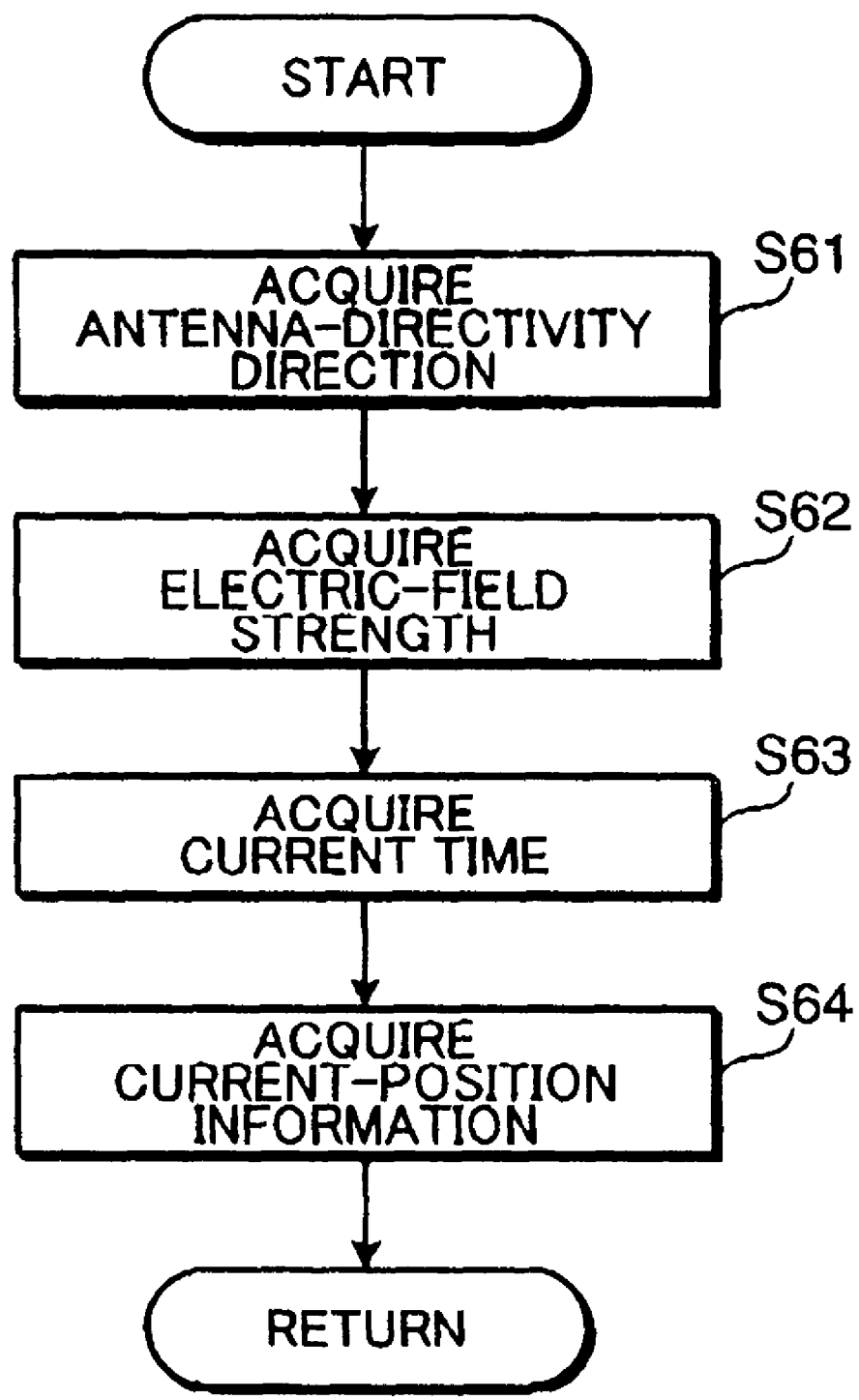
FIG. 14 is a flow chart, showing a measurement processing in the second embodiment of the present invention.

FIG. 14 is a flow chart, showing a measurement processing In the second embodiment. First, in the measurement processing, the control section 40 acquires an antenna-directivity direction from the direction measurement section 60 (in a step S61). Next, the control section 40 acquires an electric-field strength from the electric-field strength measurement section 70 (in a step S62). Sequentially, the control section 40 acquires the current time from the clock 90 (in a step S63). Next, the control section 40 acquires information on the current position from the GPS 100 (in a step S64).

Herein, an electric-field strength management table in the storage section 30 which is updated in a storage-section update processing will be described. FIG. 15 is a representation, showing an example of the electric-field strength management table in the second embodiment.

In this second embodiment, the clock 90 and the GPS 100 are added to the configuration of the first embodiment. Hence, in an electric-field strength management table 420 of the second embodiment, time information 405 and position information 406 are added to the electric-field strength management table 400 of the first embodiment shown in FIG. 4.

The time information 405 is information on year, month, day and hour, minute, second which is acquired from the clock 90. In the storage-section update processing described later, it is used for deleting information if the time which corresponds to a threshold value or above elapses. The threshold value is stored in the storage section 30, and the threshold value can be changed by varying the value stored in the storage section 30.

The position information 406 is information on latitude and longitude (degree, minute, second and second decimal-point) which is acquired from the GPS 100. In the storage-section update processing described later, a movement distance is calculated from the information on latitude and longitude. It is used for deleting information from the storage section 30 if the portable television-broadcast reception unit moves by the distance which corresponds to a threshold value or above. The threshold value is stored in the storage section 30, and the threshold value can be changed by varying the value in the storage section 30.

As the implementation-combination pattern, three patterns can be used, including a configuration obtained by adding only the clock 90 to the configuration of the first embodiment, a configuration obtained by adding only the GPS 100 and a configuration obtained by adding the clock 90 and the GPS 100.

Figure 16:
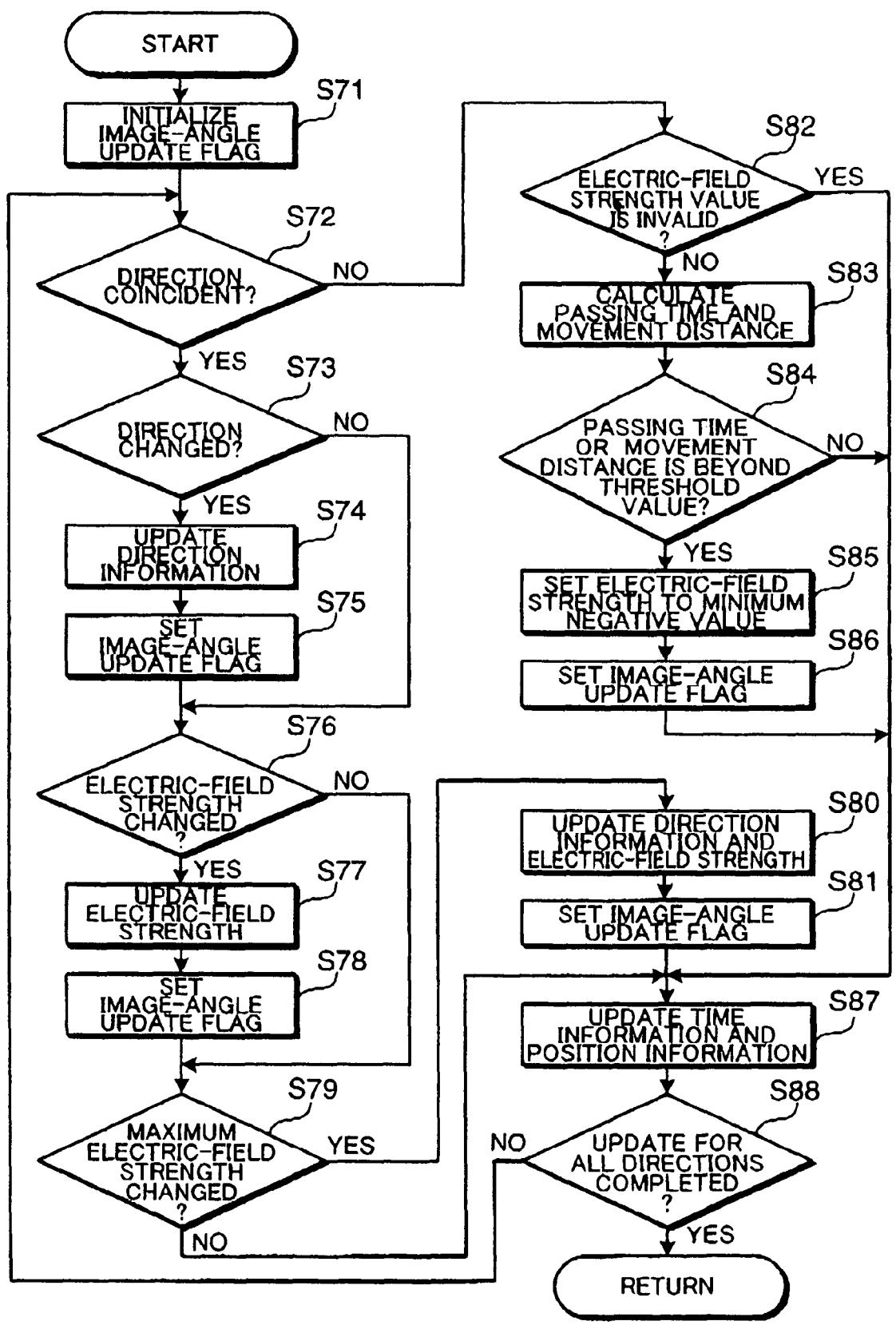
FIG. 16 is a flow chart, showing a storage-section update processing in the second embodiment of the present invention.

Sequentially, the storage-section update processing in the second embodiment will be described. FIG. 16 is a flow chart, showing the storage-section update processing in the second embodiment of the present invention. In the following description, the difference between the storage-section update processing of the first embodiment and the storage-section update processing of the second embodiment will be mentioned.

In the first embodiment, the electric-field strength management table is updated using information acquired from the direction measurement section 60 and the electric-field strength measurement section 70. Thus, only in terms of the current antenna-directivity direction, the electric-field strength management table is updated.

On the other hand, in the second embodiment, in order to scrap old information acquired in the past, using the time information 405 and the position information 406 which are held in the electric-field strength management table, the time which elapses and the movement distance after an electric-field strength 402 has been acquired are compared with the threshold value held in the storage section 30. Thereby, also in terms of directions other than the current antenna-directivity direction, a decision is made whether the electric-field strength 402 is valid or invalid. Hence, in terms of all the directions held in the electric-field strength management table, an update is executed. Incidentally, in the following description, the direction of the electric-field strength management table which is currently subjected to the update processing is referred to simply as the current update-processing direction.

Hereinafter, a description will be given along a flow chart in FIG. 16. Incidentally, the processing of a step S71 in FIG. 16 is the same as the processing of the step S31 in FIG. 5, and thus, its description is omitted. The control section 40 decides whether or not the current antenna-directivity direction coincides with the current update-processing direction (in a step S72). The control section 40 executes an update one after another about all the directions of east, west, south, north, northeast, southeast, southwest and northwest.

Herein, if the decision is made that the current antenna-directivity direction coincides with the current update-processing direction (YES at the step S72), the control section 40 executes the processing of the step S73 to the step S81. Incidentally, the processing of the step S73 to the step S81 is the same as the processing of the step S32 to the step S40 in the first embodiment of FIG. 5, and thus, its description is omitted.

In contrast, if the decision is made that the current antenna-directivity direction does not coincide with the current update-processing direction (NO at the step S72), the control section 40 decides whether or not the value of the electric-field strength 402 in the current update-processing direction is invalid in the electric-field strength management table (in a step S82). In this embodiment, the invalid value is designed to be the minimum negative value. Hence, the control section 40 decides whether or not the value of the electric-field strength 402 is the minimum negative value.

If the decision is made that the value of the electric-field strength 402 is the minimum negative value (YES at the step S82), the electric-field strength 402 in the current update-processing direction is already invalid. Then, the control section 40 updates the time information and the position information in the current update-processing direction. Thereby, the update processing in the current update-processing direction ends (in a step S87).

On the other hand, if the decision is made that the electric-field strength 402 is not the minimum negative value (NO at the step S82), the control section 40 calculates the time which elapses and the movement distance after the electric-field strength 402 in the current update-processing direction has been acquired (in a step S83).

Herein, how to calculate the passing time and the movement distance will be described below. First, the control section 40 reads, from the storage section 30, the time information 405 which corresponds to the current update-processing direction of the electric-field strength management table. Then, the control section 40 calculates, as the passing time, the difference in time between this time information 405 and the current time acquired from the clock 90. Besides, the control section 40 reads, from the storage section 30, the position information 406 in the current update-processing direction of the electric-field strength management table. Then, the control section 40 calculates, as the movement distance, the difference between this position information 406 and the latitude and longitude of the current position acquired from the GPS 100.

Next, the control section 40 compares the passing time and the movement distance which it has calculated and the threshold values held in the storage section 30. Then, it decides whether or not the passing time or the movement distance is equal to, or above, the threshold value (in a step S84). In this embodiment, a decision is made whether or not the passing time or the movement distance is equal to, or above, the threshold value. However, the present invention is not limited especially to this, and thus, a decision may also be made whether or not the passing time and the movement distance are equal to, or above, the threshold values.

If the decision is made that the passing time or the movement distance is equal to, or above, the threshold value (YES at the step S84), the control section 40 decides that the electric-field strength 402 in the current update-processing direction is invalid. Then, it sets the minimum negative value in the electric-field strength 402 in the current update-processing direction of the electric-field strength management table (in a step S85). Next, the control section 40 sets the image-angle update flag 404 of the electric-field strength management table to "update necessary" (in a step S86). After setting the image-angle update flag 404 of the electric-field strength management table to "update necessary", the control section 40 updates the time information and the position information in the current update-processing direction. Thereby, the update processing in the current update-processing direction comes to an end (in the step S87).

On the other hand, if the decision is made that the passing time or the movement distance is below the threshold value (NO at the step S84), the control section 40 decides that the electric-field strength 402 in the current update-processing direction is valid. Then, it updates the time information and the position information in the current update-processing direction. Thereby, the update processing in the current update-processing direction comes to an end (in the step S87).

After ending the update processing, the control section 40 decides whether or not the update processing has been completed for all the directions of the electric-field strength management table (in the step S88). Herein, if the decision is made that the update processing has not been completed for all the directions (NO at the step S88), then in order to execute the update processing for the next direction, the control section 40 returns to the processing of the step S72 and executes the processing of the step S72 and the following steps.

In contrast, if the decision is made that the update processing has been completed for all the directions (YES at the step S88), that means the update processing has ended for all the directions of the electric-field strength management table. Thereby, the control section 40 finishes the storage-section update processing.

Figure 18A:
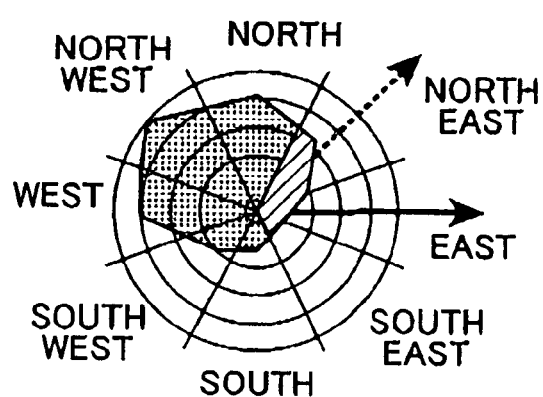
FIG. 18 is a representation, showing the electric-field strength at each point of FIG. 17.
Figure 18B:
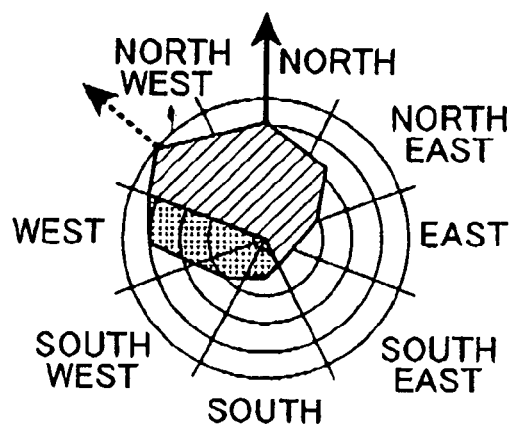
Figure 18C:
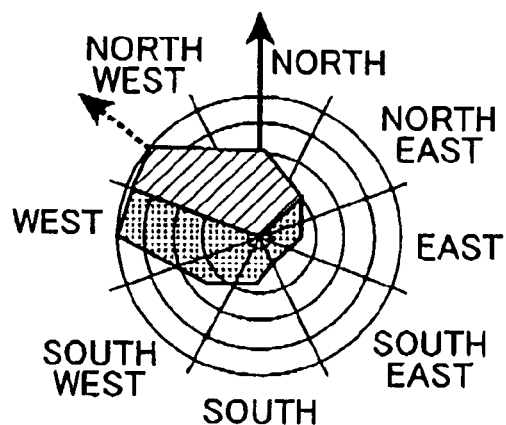
Figure 18D:
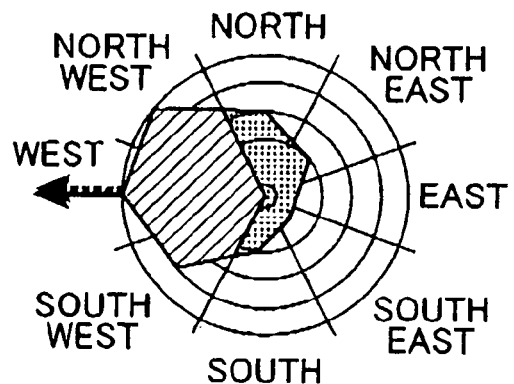

Herein, in this embodiment, a description will be given about the process for scrapping the information judged invalid. FIG. 17 is a representation, showing the processing for deleting information in the second embodiment. FIG. 18 is a representation, showing the electric-field strength at each point of FIG. 17. FIG. 18A shows the electric-field strength at a point A of FIG. 17; FIG. 18B, the electric-field strength at a point B of FIG. 17; FIG. 18C, the electric-field strength at a point C of FIG. 17; and FIG. 18D, the electric-field strength at a point D of FIG. 17. Incidentally, in FIG. 18, the solid-line arrow indicates the direction of antenna directivity, and the dashed-line arrow indicates the direction in which the electric-field strength comes to the maximum. The hatched area represents the actual electric-field strength, and the obliquely hatched area shows the actual electric-field strength held by the portable television-broadcast reception unit.

Herein, a description will be given about the case where a user who carries the portable television-broadcast reception unit passes through each point A, B, C and D and moves to a destination. At the point A, the user who holds the portable television-broadcast reception unit is moving to the east. At this time, the portable television-broadcast reception unit holds information on the electric-field strength in the northeast, the east and the southeast. At the point B, the user is moving toward the north. At this time, the portable television-broadcast reception unit holds information on the electric-field strength in the northwest, the north, the northeast, the east and the southeast.

At the point C, the user is moving toward the north. At this time, the time which is equal to, or beyond, the threshold value is supposed to have elapsed from the point B. Simultaneously, the portable television-broadcast reception unit is already moving by the distance which is equal to, or above, the threshold value. Therefore, a decision is made that the electric-field strength information of the east and the southeast is invalid which was held by the portable television-broadcast reception unit at the point A. Thus, it is already deleted from the portable television-broadcast reception unit.

At the point D, the user is moving toward the west. At this time, the time which is equal to, or beyond, the threshold value has passed from the point C, and the portable television-broadcast reception unit has moved by the distance which is equal to, or above, the threshold value. In this state, therefore, a decision is made that the electric-field strength information of the north and the northeast is invalid which was held by the portable television-broadcast reception unit at the point C. Thus, it is already deleted from the portable television-broadcast reception unit.

In the above described procedure, when the user who carries the portable television-broadcast reception unit moves, from among the pieces of information of the electric-field strength management table which are managed by the storage section 30 of the portable television-broadcast reception unit, information which is Judged to be invalid can be deleted. This helps prevent wrong, old information from being displayed and offered to the user who carries the portable television-broadcast reception unit.

In short, if the time which is equal to, or beyond, the threshold value elapses from the time when an electric-field strength value included in the electric-field strength management table has been acquired, the electric-field strength value is scrapped. Therefore, an image can be prevented from being displayed based on the old electric-field strength management table.

In addition, if the portable television-broadcast reception unit moves by the distance which is equal to, or above, the threshold value from the position in which an electric-field strength value included in the electric-field strength management table has been acquired, the electric-field strength value is scrapped. Therefore, an image can be prevented from being displayed based on the old electric-field strength management table.

Third Embodiment

Figure 19:
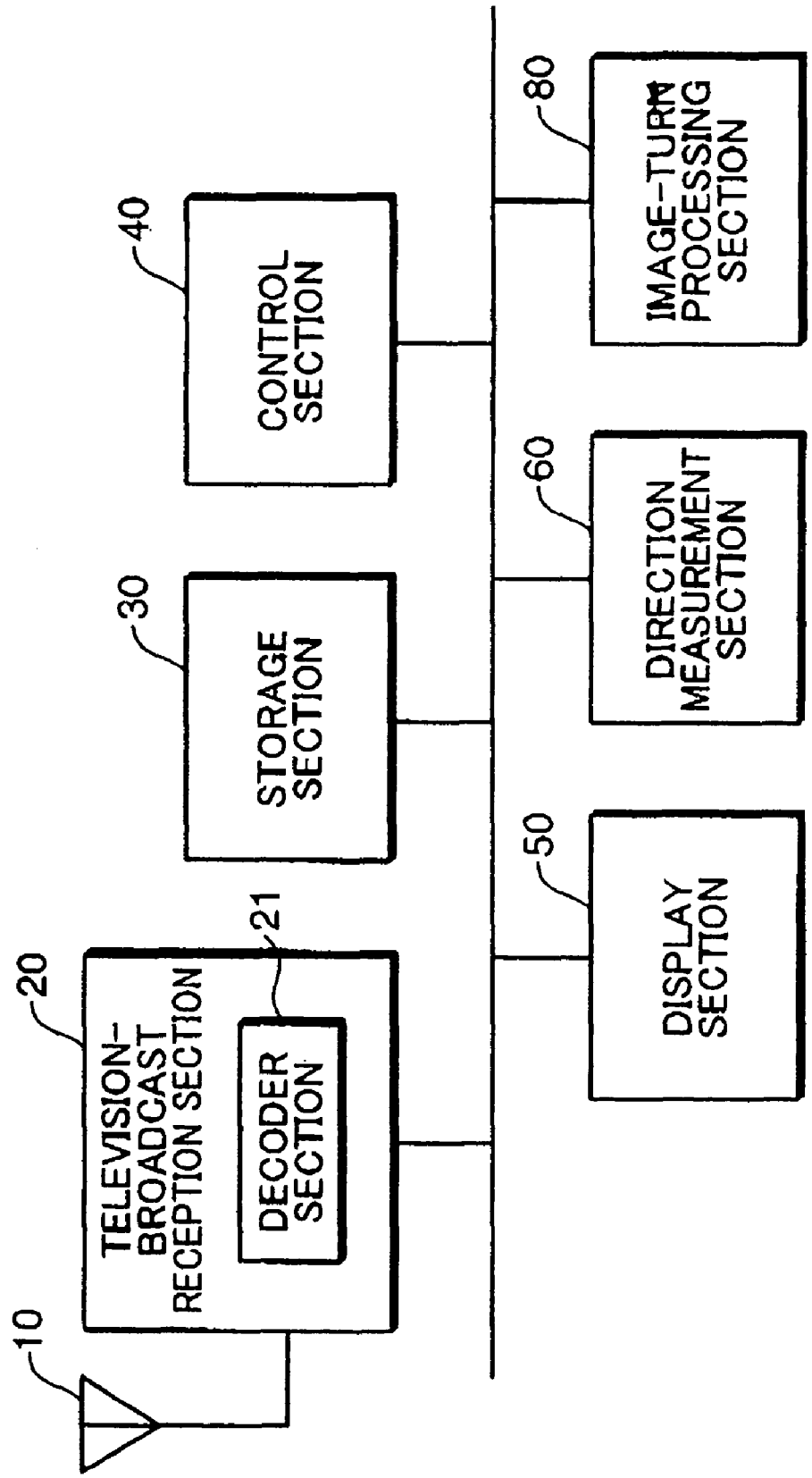
FIG. 19 is a block diagram, showing the configuration of a portable television-broadcast reception unit according to a third embodiment of the present invention.

Next, a portable television-broadcast reception unit according to a third embodiment of the present invention will be described. In this embodiment, in the case where the direction in which the electric-field strength comes to the maximum is determined, without using the electric-field strength measurement section 70 in the first embodiment of FIG. 1, the direction in which the electric-field strength becomes the maximum is selected using a bit error rate measured by a decoder section of the television-broadcast reception section 20. FIG. 19 is a block diagram, showing the configuration of the portable television-broadcast reception unit according to the third embodiment of the present invention.

The portable television-broadcast reception unit shown in FIG. 19 includes a television-broadcast reception section 20, a storage section 30, a control section 40, a display section 50, a direction measurement section 60, and an image-turn processing section 80. In FIG. 19, component elements are given the same reference characters and numerals as those of the first embodiment shown in FIG. 1, as long as the former have identical configurations with the latter. Then, their description is omitted. The television-broadcast reception section 20 is provided with a decoder section 21. The decoder section 21 decodes an electronic radio wave received by a directional antenna 10. At this time, the decoder section 21 measures a bit error rate. In this embodiment, the control section 40 decides that the direction in which the bit error rate measured by the decoder section 21 becomes the minimum is the one where the electric-field strength comes to the maximum. In this embodiment, the decoder section 21 corresponds to an example of the bit-error rate measurement section.

In this way, a broadcast wave is received by the directional antenna 10. In the storage section 30, measurement information is stored which includes the direction of the directional antenna 10 and the bit error rate of the broadcast wave received by the directional antenna 10. The measurement of the direction of the directional antenna 10 and the measurement of the bit error rate are controlled. Then, the measurement information stored in the storage section 30 is updated, and the direction in which the minimum bit error rate can be obtained is selected. Next, an received image is turned so that the upper part of the image is oriented to the selected direction in which the minimum bit error rate can be obtained. Then, the turned image is displayed.

Therefore, the upper part of a displayed image coincides with the direction in which the minimum bit error rate is obtained. Hence, the direction of a directional antenna is led toward the image's upper part. This makes it possible to change the directional antenna's direction easily to a direction where an enough electric-field strength to watch television can be obtained.

Incidentally, in this embodiment, the control section 40 selects the direction in which the bit error rate measured by the decoder section 21 becomes the minimum. However, the present invention is not limited especially to this. The direction where the bit error rate which is equal to, or below, a threshold value is obtained may also be chosen.

Fourth Embodiment

Next, a portable television-broadcast reception unit according to a fourth embodiment of the present invention will be described. The portable television-broadcast reception unit according to the fourth embodiment is configured so that a display screen and a directional antenna are mutually independent. The display screen is designed so as to turn with respect to the directional antenna.

FIG. 20 is a representation, showing the external appearance of portable television-broadcast reception units according to the fourth embodiment of the present invention. FIG. 20A shows the external appearance of a portable television-broadcast reception unit in which a directional antenna is united with a main body. FIG. 20B shows the external appearance of a portable television-broadcast reception unit in which a directional antenna can be turned with respect to a main body. FIG. 20C shows the external appearance of another portable television-broadcast reception unit in which a directional antenna can be turned with respect to a main body. FIG. 20D shows the external appearance of still another portable television-broadcast reception unit in which a directional antenna can be turned with respect to a main body.

Figure 20C:
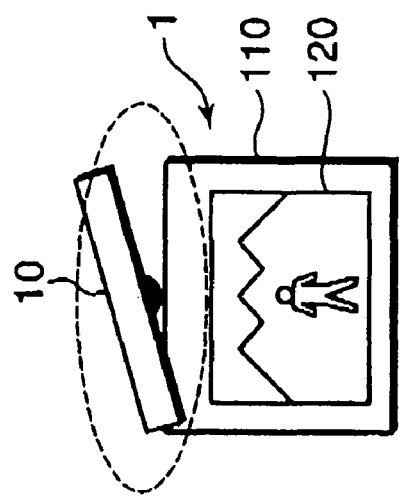
FIG. 20 is a representation, showing the external appearance of a portable television-broadcast reception unit according to a fourth embodiment of the present invention.
Figure 20B:
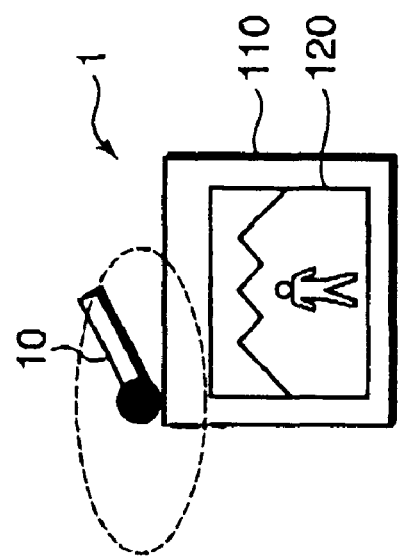
Figure 20A:
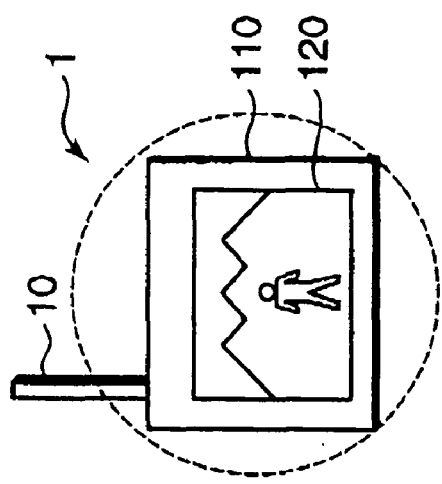

In a portable television-broadcast reception unit 1 shown in FIG. 20A, a directional antenna 10 is united with a main body 110 of the portable television-broadcast reception unit 1. A display screen 120 is attached so as to turn with respect to the main body 110.

Figure 21:
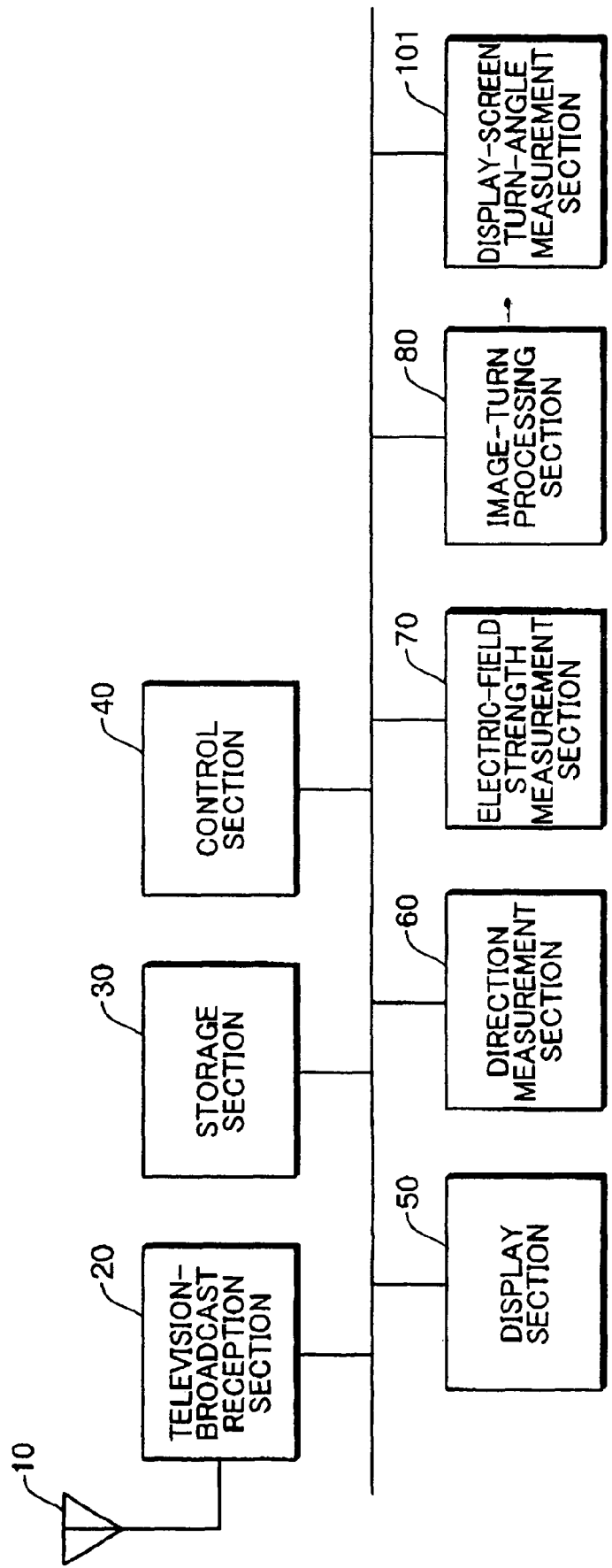
FIG. 21 is a block diagram, showing the configuration of the portable television-broadcast reception unit shown in FIG. 20A.

FIG. 21 is a block diagram, showing the configuration of the portable television-broadcast reception unit shown in FIG. 20A. In FIG. 21, the portable television-broadcast reception unit is provided with a display-screen turn-angle measurement section 101, in addition to the configuration of the first embodiment shown in FIG. 1.

The display-screen turn-angle measurement section 101 measures an angle by which the display screen 120 is turned with respect to the direction of antenna directivity. In terms of the display-screen turn angle, when the display screen 120 turns counterclockwise with respect to the directional antenna 10, the turn angle in that direction is designed to be positive.

The control section 40 subtracts the angle of the antenna-directivity direction and the display-screen turn angle from the angle of the direction in which the electric-field strength becomes the maximum. Thereby, it calculates an image turn angle. If the direction in which the electric-field strength becomes the maximum coincides with the antenna-directivity direction, the control section 40 does not turn the image.

Figure 22:
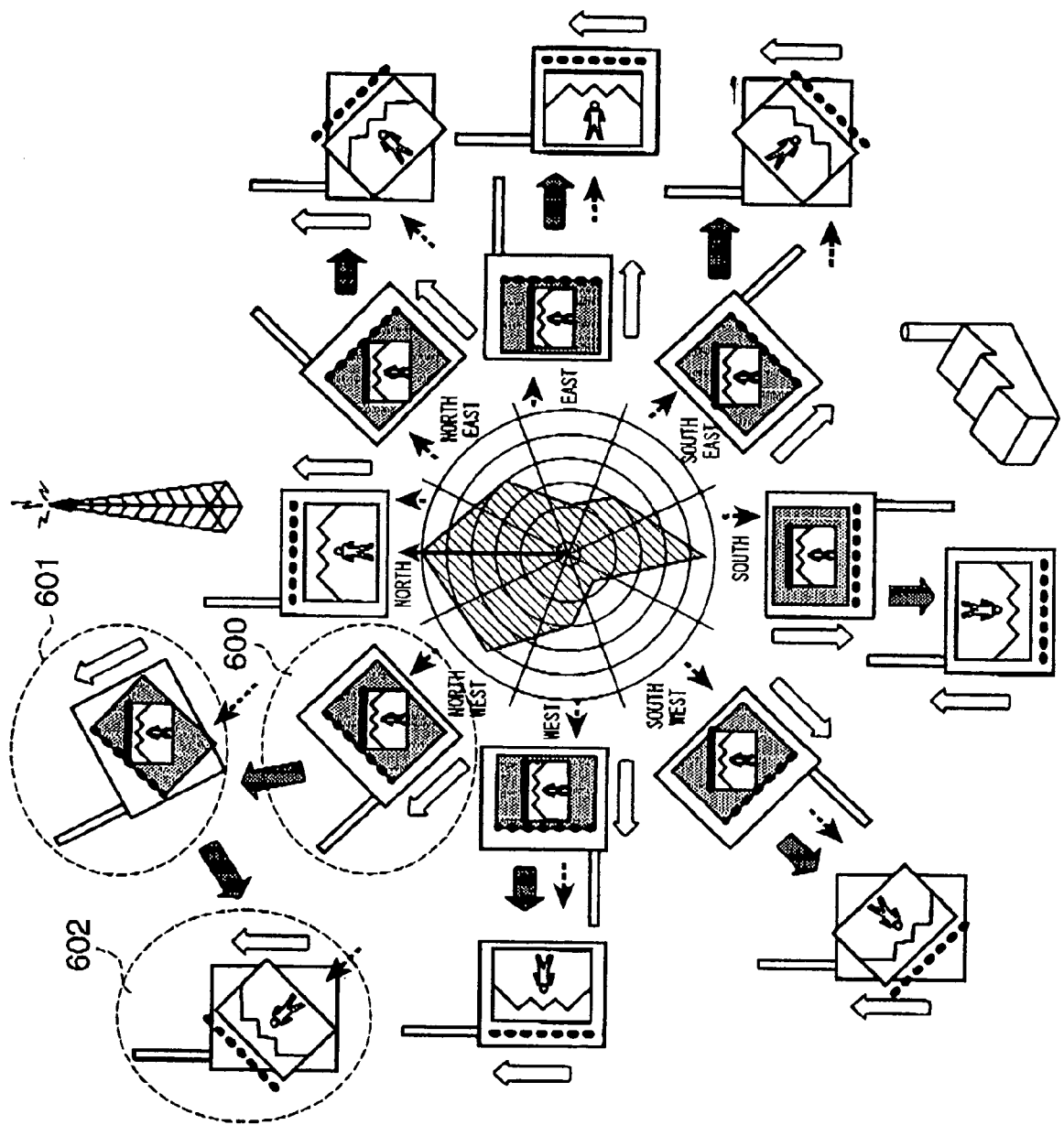
FIG. 22 is a representation, showing a display example of a change in the angle of an image when a user is guided so that the direction of antenna directivity is oriented to the direction where the maximum electric-field strength is obtained in the portable television-broadcast reception unit shown in FIG. 20A.

FIG. 22 is a representation, showing a display example of a change in the angle of an image when a user is guided so that the direction of antenna directivity is oriented to the direction where the maximum electric-field strength is obtained in the portable television-broadcast reception unit shown in FIG. 20A. In FIG. 22, the user stays at the center of a circle, and a broadcast antenna is located on the exact north of the user. Each dashed-line arrow Indicates the direction of the user's gaze. Each white arrow indicates the direction of antenna directivity. The solid-line arrow indicates the direction in which the electric-field strength comes to the maximum. In the example of FIG. 22, it points to the north. The obliquely hatched area 350 represents the electric-field strength.

As shown in FIG. 22, if the direction in which the electric-field strength becomes the maximum does not coincide with the antenna-directivity direction, the upper part of an image to be displayed on the display screen is displayed in the direction in which the electric-field strength becomes the maximum. Herein, the user turns the main body to turn the directional antenna 10, so that the antenna-directivity direction comes to the direction of the upper part of an image to be displayed on the display screen. Thereby, the direction in which the electric-field strength becomes the maximum coincides with the antenna-directivity direction. This helps display the image normally without turned.

For example, in a state 600 of FIG. 22, the user's eyes, the antenna-directivity direction and the display screen is upper part are oriented to the northwest. In this case, since the direction in which the electric-field strength becomes the maximum is the north, the image's upper part is displayed to the north. Incidentally, in the state 600, the angle of the direction in which the electric-field strength becomes the maximum is zero degrees; the angle of the antenna-directivity direction is 45 degrees; the angle of the display-screen turn angle is zero degrees; and the image turn angle is −45 degrees.

Next, with keeping the display screen's position fixed, the user turns the directional antenna 10 in the direction pointed by the image's upper part. In a state 601, the angle of the direction in which the electric-field strength becomes the maximum is zero degrees: the angle of the antenna-directivity direction is 30 degrees; the angle of the display-screen turn angle is 15 degrees; and the image turn angle is −45 degrees.

Then, the directional antenna 10 is further turned from the state 601, so that the direction in which the electric-field strength becomes the maximum coincides with the antenna-directivity direction. In such a coincident state 602, the angle of the direction in which the electric-field strength becomes the maximum is zero degrees: the angle of the antenna-directivity direction is zero degrees; the angle of the display-screen turn angle is 45 degrees; and the image turn angle is zero degrees. In the state 602, the user's gaze and the display screen's upper part are oriented to the northwest while the antenna-directivity direction is oriented to the north. In this case, since the direction in which the electric-field strength becomes the maximum is coincident with the antenna-directivity direction, a display is made so that the direction of the display screen's upper part coincides with the direction of the image's upper part.

Figure 20D:
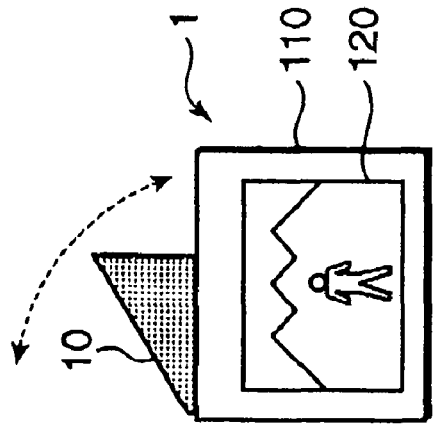

Moreover, in the portable television-broadcast reception unit 1 shown in FIGS. 20B to 20D, the display screen 120 is united with the main body 110 of the portable television-broadcast reception unit 1. Then, the directional antenna 10 is attached so as to turn with respect to the main body 110. In FIG. 20B, the display screen 120 is united with the main body 110 of the portable television-broadcast reception unit 1. An end part of the pole-shaped directional antenna 10 is connected to the main body 110 so that it can be turned. In FIG. 20C, the display screen 120 is united with the main body 110 of the portable television-broadcast reception unit 1. The middle part of the pole-shaped directional antenna 10 is connected to the main body 110 so that it can be turned. In FIG. 20D, the display screen 120 is united with the main body 110 of the portable television-broadcast reception unit 1. One side of the flat directional antenna 10 is connected to the main body 110 so that it can be turned.

Figure 23:
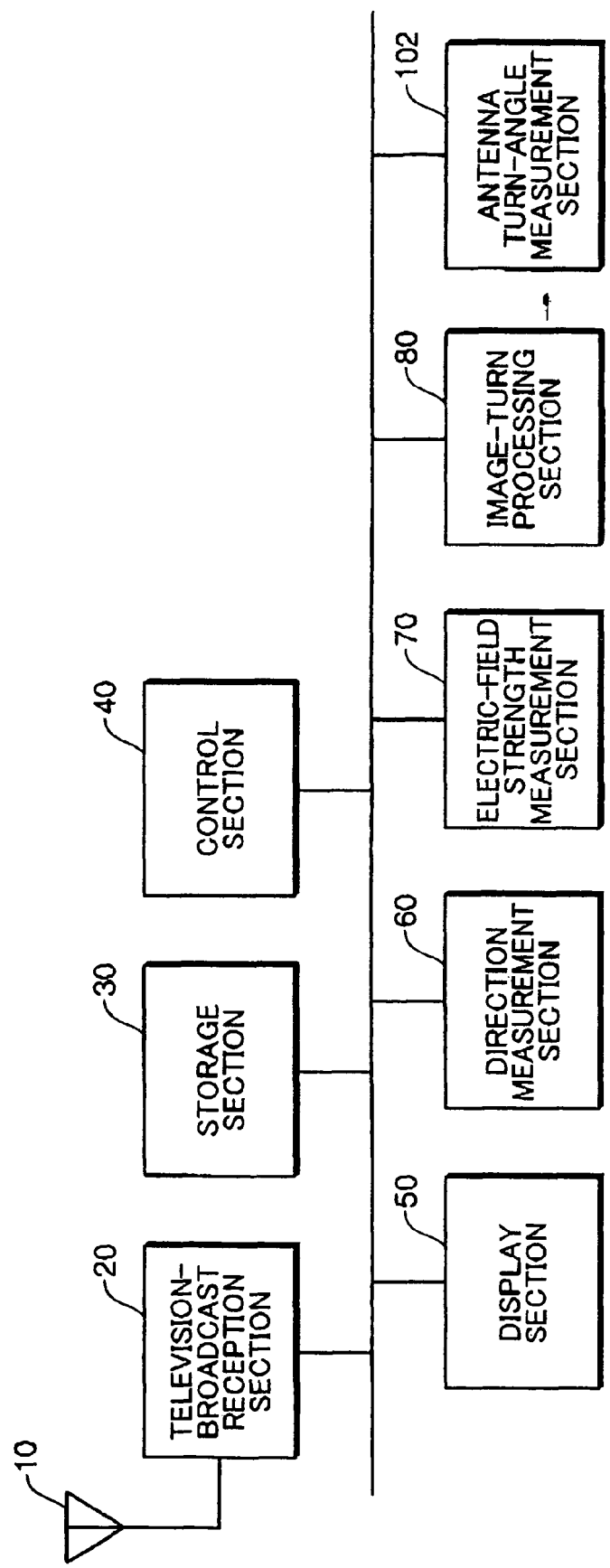
FIG. 23 is a block diagram, showing the configuration of the portable television-broadcast reception units shown in FIGS. 20A to 20D.

FIG. 23 is a block diagram, showing the configuration of the portable television-broadcast reception units shown in FIGS. 20A to 20D. In FIG. 23, the portable television-broadcast reception unit is provided with an antenna turn-angle measurement section 102, in addition to the configuration of the first embodiment shown In FIG. 1.

The antenna turn-angle measurement section 102 measures an angle by which the directional antenna 10 is turned with respect to the display screen 120. In terms of the turn angle of the directional antenna 10, when the directional antenna 10 turns counterclockwise with respect to the direction perpendicular to the display screen 120's upper part, the turn angle in that direction is designed to be positive.

The control section 40 subtracts the angle of the antenna-directivity direction and the turn angle of the directional antenna 10 from the angle of the direction in which the electric-field strength becomes the maximum. Thereby, it calculates an image turn angle. If the direction in which the electric-field strength becomes the maximum coincides with the antenna-directivity direction, the control section 40 does not turn the image.

Figure 24:
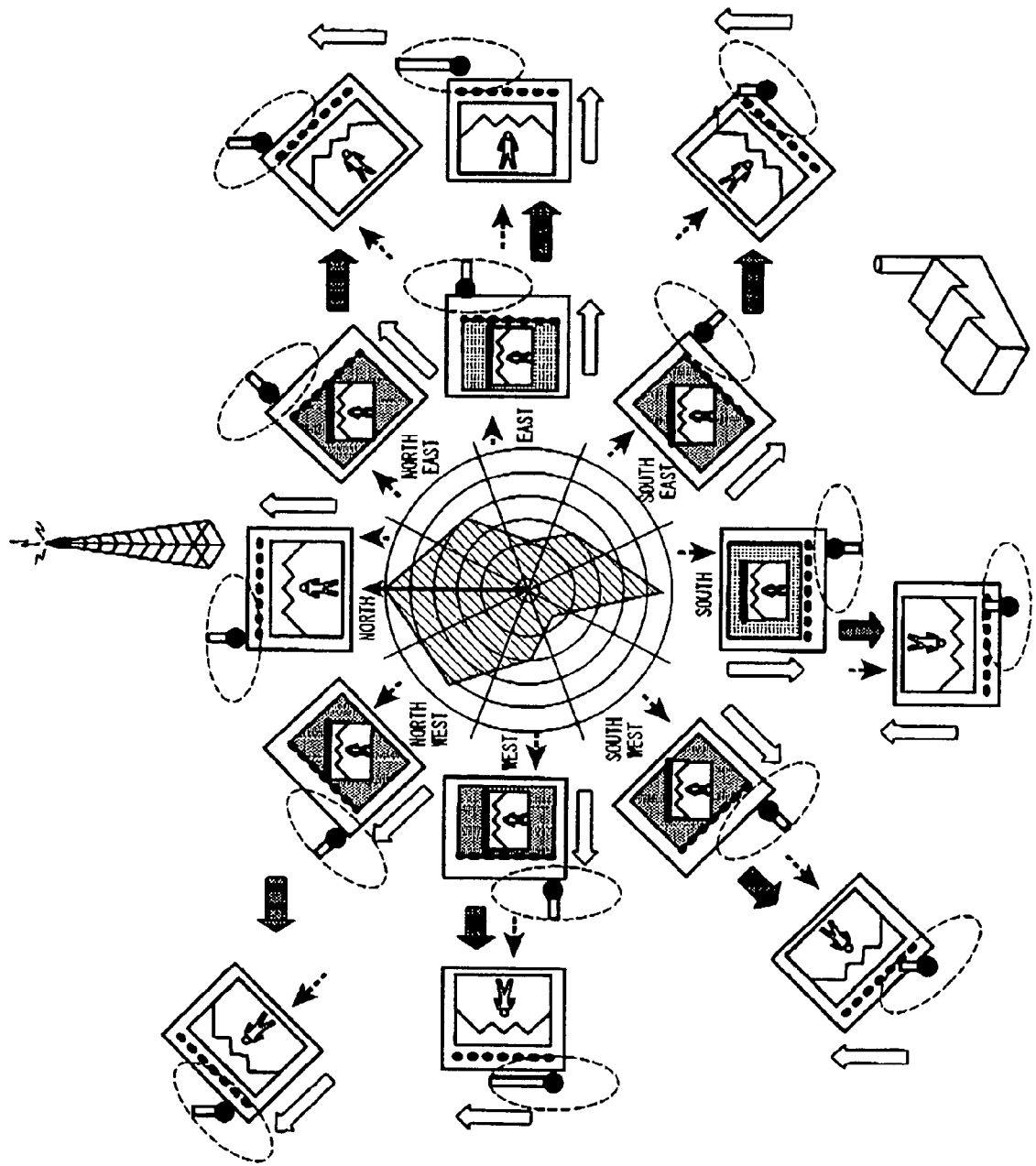
FIG. 24 is a representation, showing a display example of a change in the angle of an image when a user is guided so that the direction of antenna directivity is oriented to the direction where the maximum electric-field strength is obtained in the portable television-broadcast reception unit shown in FIG. 208.

FIG. 24 is a representation, showing a display example of a change in the angle of an image when a user is guided so that the direction of antenna directivity is oriented to the direction where the maximum electric-field strength is obtained in the portable television-broadcast reception unit shown in FIG. 20B. In FIG. 24, the user stays at the center of a circle, and a broadcast antenna is located on the exact north of the user. Each dashed-line arrow indicates the direction of the user's gaze. Each white arrow indicates the direction of antenna directivity. The solid-line arrow indicates the direction in which the electric-field strength comes to the maximum. In the example of FIG. 24, it points to the north. The obliquely hatched area represents the electric-field strength. The dashed-line ellipse indicates the horizontal plane on which the directional antenna 10 turns.

As shown in FIG. 24, if the direction in which the electric-field strength becomes the maximum does not coincide with the antenna-directivity direction, the upper part of an image to be displayed on the display screen is displayed in the direction in which the electric-field strength becomes the maximum. Herein, the user turns the directional antenna 10, so that antenna-directivity direction comes to the direction of the upper part of an image to be displayed on the display screen. Thereby, the direction in which the electric-field strength becomes the maximum coincides with the antenna-directivity direction. This helps display the image normally without turned.

Figure 25:
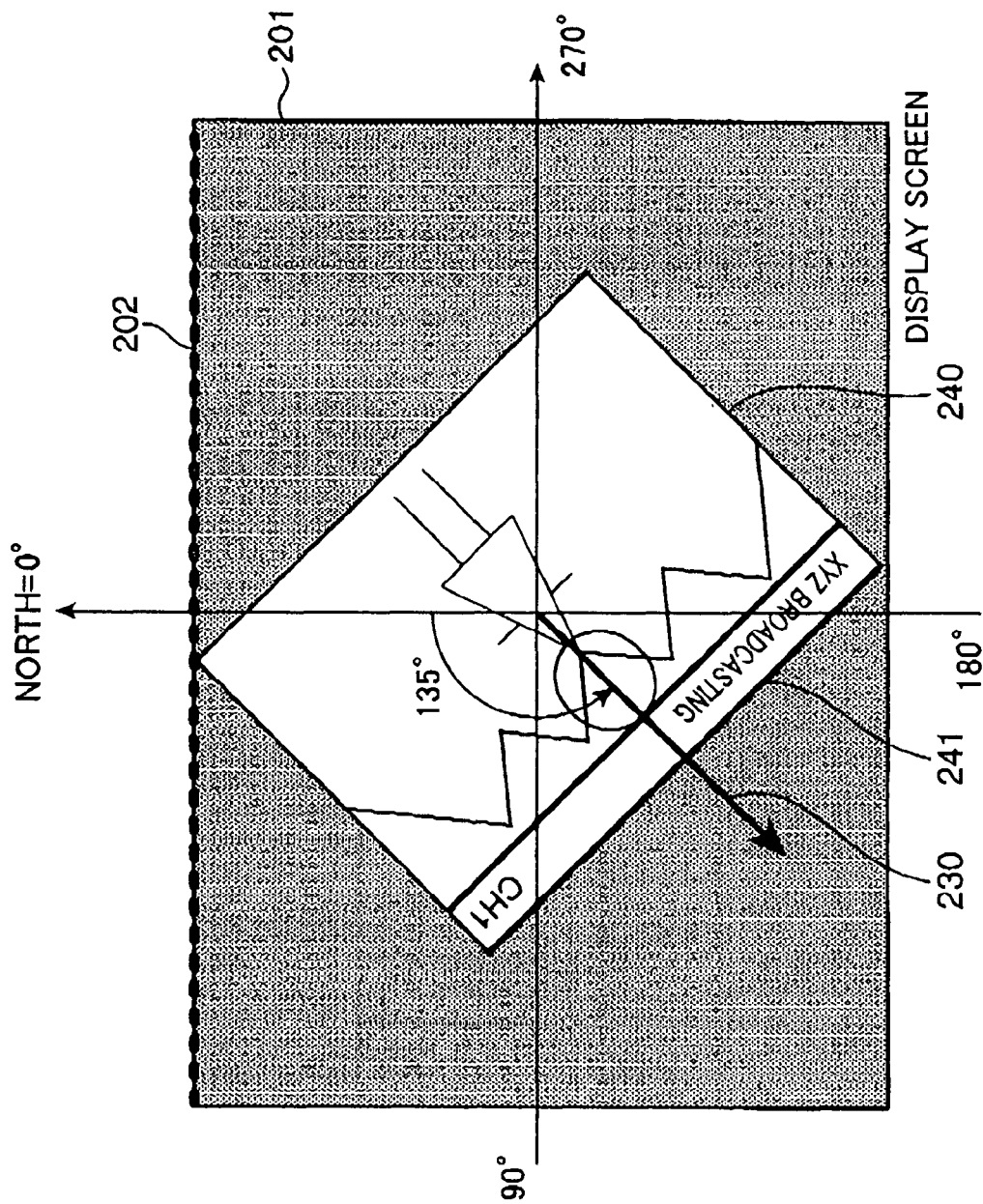
FIG. 25 is a representation, showing an example of a display screen when d display frame is displayed on the display screen.

Incidentally, in each of the above described first to fourth embodiments, an image is displayed on a display screen. When a digital broadcast is received, an image cannot be displayed if the electric-field strength is inadequate. Hence, in the case where only an image is displayed on the display screen, if the electric-field strength is inadequate, nothing is displayed on the display screen. This makes it impossible to become aware of the direction in which the electric-field strength becomes the maximum. Therefore, in each of the first to fourth embodiments, a display frame may also be displayed on the display screen so that an image is displayed within the display frame. FIG. 25 is a representation, showing an example of a display screen when a display frame is displayed on the display screen.

In FIG. 25, a display frame 240 is displayed on a display screen 201. Inside of this display frame 240, an image is displayed. The display frame 240 turns together with an image. In an upper part 241 of the display frame 240, there are displayed the name of a broadcasting station and the number of a channel. An arrow 230 indicates the direction in which the electric-field strength becomes the maximum. The display frame 240 is turned so that its upper side becomes vertical to the direction in which the maximum electric-field strength is obtained. In this way, a display frame is displayed on a display screen and the display frame's upper part is oriented to the direction in which the electric-field strength becomes the maximum. Thereby, even if an image cannot be displayed because the electric-field strength is inadequate, a user can recognize the direction in which the electric-field strength becomes the maximum.

Furthermore, the television-broadcast reception section 20 executes a decoding processing for decoding a received broadcast wave, but at least a part of this decoding processing may also be omitted if the control section 40 decides that the electric-field strength value is below a threshold value. In this case, the display section 50 displays only a display frame, without displaying an image received by the television-broadcast reception section 20. Incidentally, the decoding processing includes, for example, a processing for extracting the visual stream and audio stream of a targeted program from an MPEG-form transport stream, a processing for extracting visual data and audio data by decoding a visual stream and an audio stream, and the like. Among them, the television-broadcast reception section 20 executes the processing for extracting a visual stream and an audio stream and omits the processing for extracting visual data and audio data. Besides, the television-broadcast reception section 20 may also omit all the decoding processing.

As described above, if the decision is made that the electric-field strength value is below a threshold value, at least a part of this decoding processing is omitted. Then, only a display frame is displayed without displaying a received image. This makes it possible to cut down the power consumption.

Figure 26:
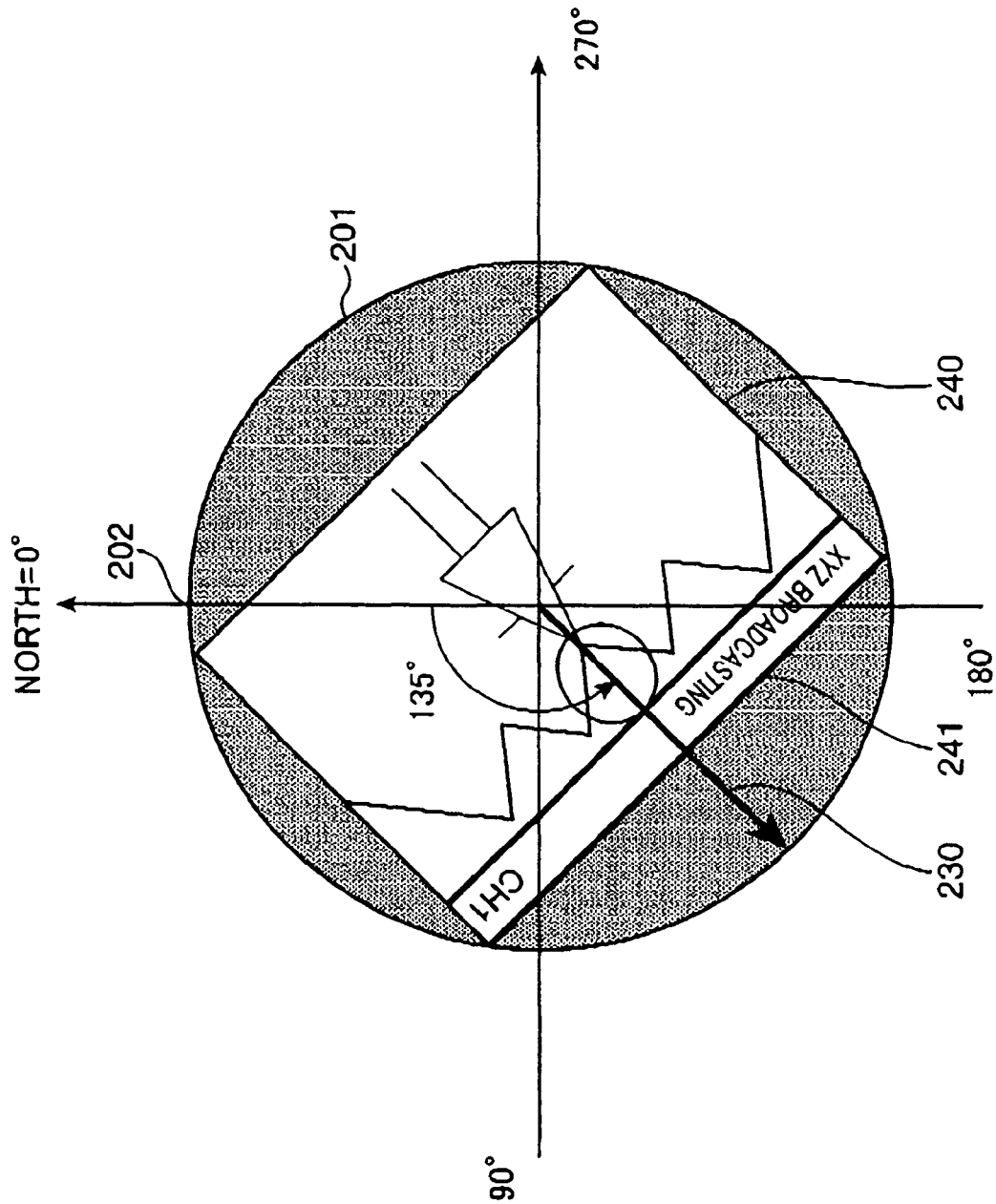
FIG. 26 is a representation, showing an example of a display image when a display frame is displayed on a circular display screen.

Moreover, in FIG. 25, the display frame 240 is designed to have a quadrilateral shape. However, the present invention is not limited especially to this, and thus, it may also be shaped like a circle. FIG. 26 is a representation, showing an example of a display image when a display frame is displayed on a circular display screen. As shown in FIG. 26, even if a display screen 201 has a circular shape, a display frame is displayed on the display screen 201. Then, it is displayed so that the display frame's upper part is oriented to the direction in which the electric-field strength becomes the maximum. Thereby, even if an image cannot be displayed because the electric-field strength is inadequate, a user can recognize the direction in which the electric-field strength becomes the maximum. Incidentally, the circular shape in this embodiment also includes an ellipse.

Fifth Embodiment

Figure 27:
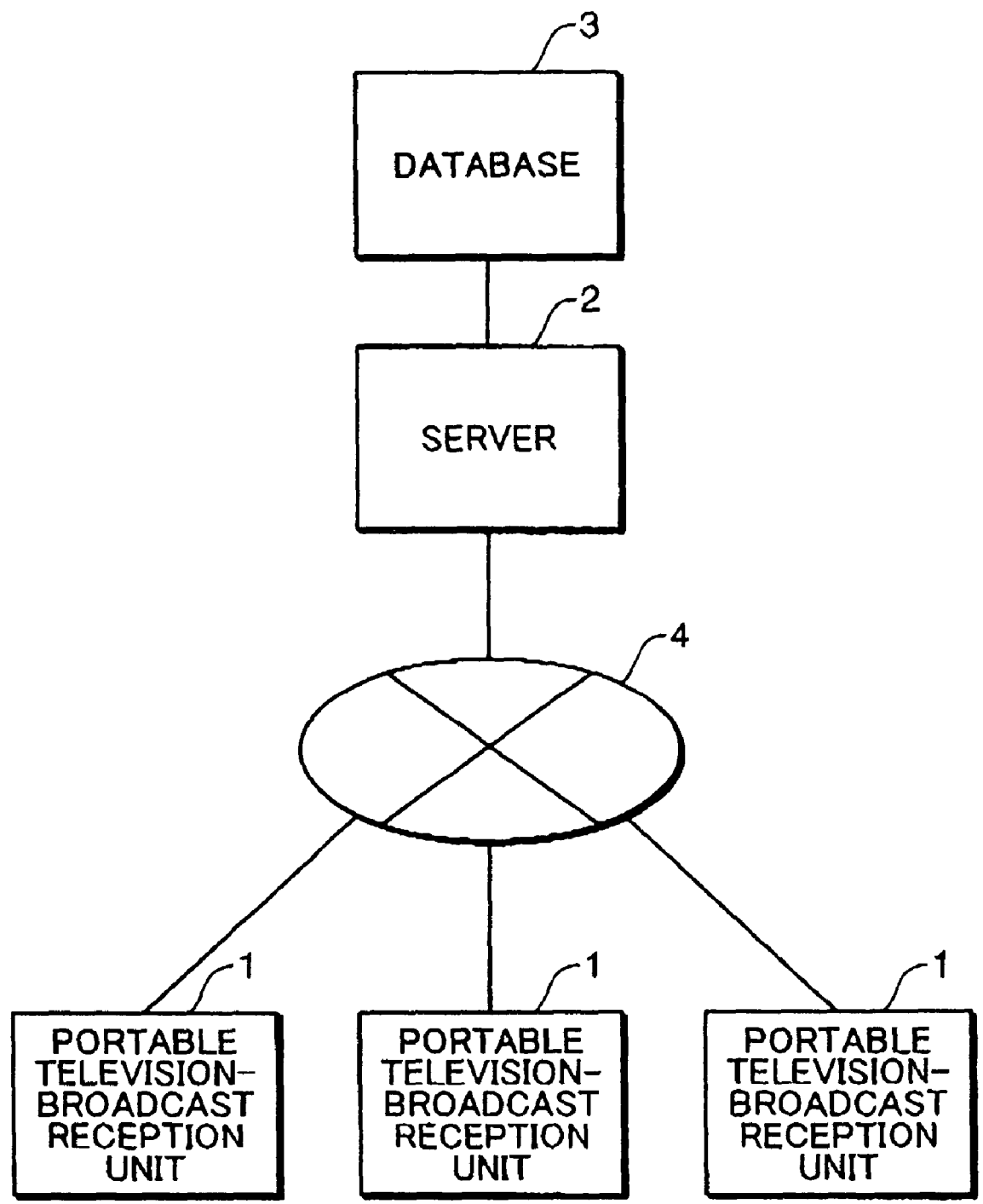
FIG. 27 is a block diagram, showing the configuration of a television-broadcast reception system according to a fifth embodiment of the present invention.

Next, a portable television-broadcast reception system according to a fifth embodiment of the present invention will be described. FIG. 27 is a block diagram, showing the configuration of the television-broadcast reception system according to the fifth embodiment. The portable television-broadcast reception system shown in FIG. 27 is configured by a portable television-broadcast reception unit 1, a server 2, and a database 3. The portable television-broadcast reception unit 1 and the server 2 are connected via a network 4 so that they can communicate with each other.

Figure 28:
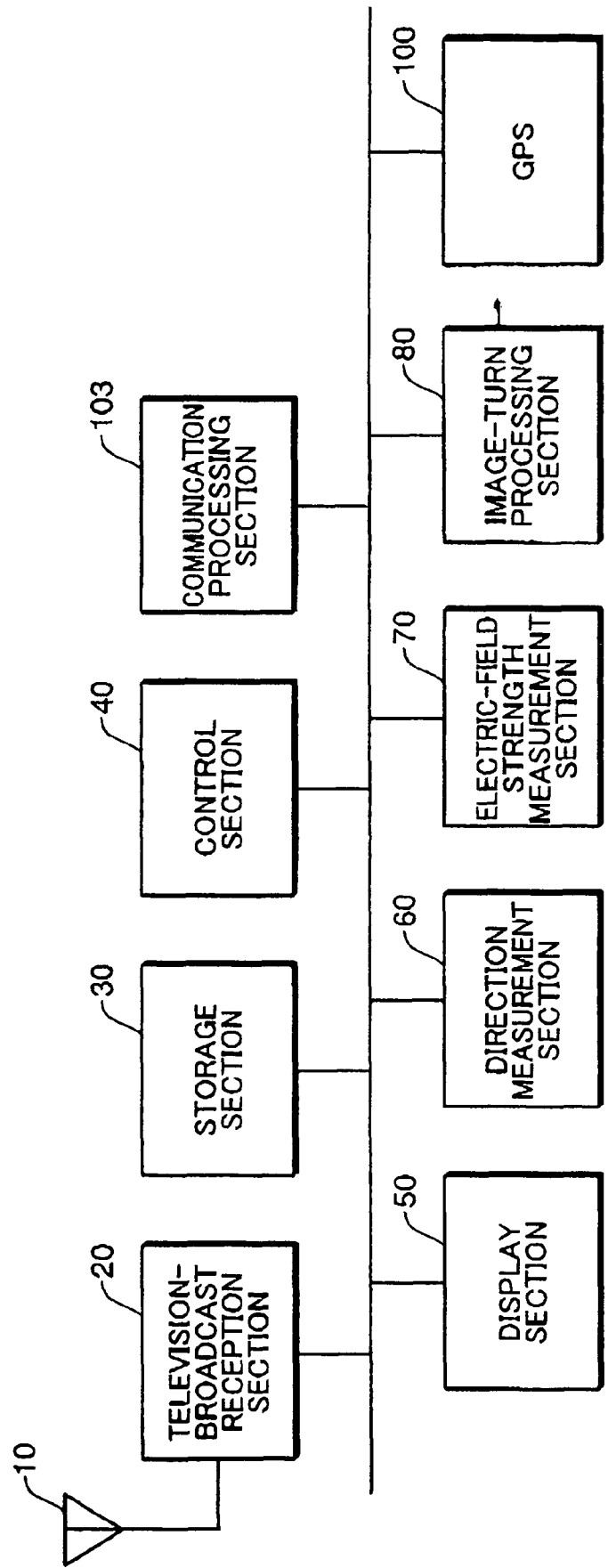
FIG. 28 is a block diagram, showing the configuration of a portable television-broadcast reception unit according to the fifth embodiment of the present invention.

FIG. 28 is a block diagram, showing the configuration of a portable television-broadcast reception unit according to the fifth embodiment of the present invention. The portable television-broadcast reception unit shown in FIG. 28 is provided with a GPS 100 and a communication processing section 103, in addition to the configuration of the first embodiment shown in FIG. 1. The GPS 100 takes information on the current position in the form of latitude and longitude. The communication processing section 103 transmits data to the server 2 and receives data from the server 2.

The control section 40 acquires information on the current position taken by the GPS 100 and outputs this current-position information to the communication processing section 103. The communication processing section 103 transmits the current-position information via the network 4 to the server 2.

The database 3 stores electric-field strength information which is obtained by relating the longitude and latitude of a predetermined place to the electric-field strength in each direction at the predetermined place. The server 2 receives the current-position information from the portable television-broadcast reception unit 1. Then, it acquires, from the database 3, the electric-field strength information of the closest place to the latitude and longitude included in this current-position information. Then, the server 2 transmits it to the portable television-broadcast reception unit 1.

The communication processing section 103 receives the electric-field strength information from the server 2 and outputs it to the control section 40. The control section 40 sets this electric-field strength information as an initial value in the electric-field strength management table. In this embodiment, the communication processing section 103 corresponds to an example of the communication section.

Figure 29B:
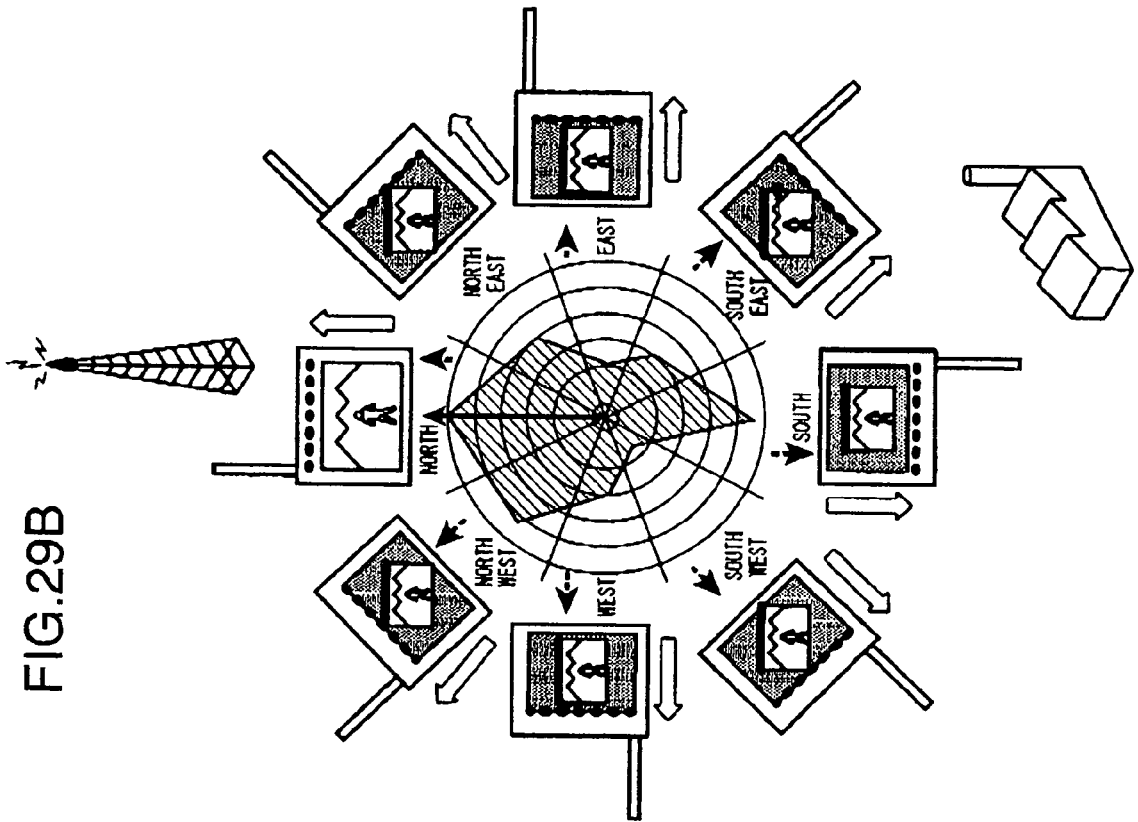
FIG. 29 is a representation, showing the processing for acquiring electric-field strength information from a server and setting an electric-field strength management table.
Figure 29A:
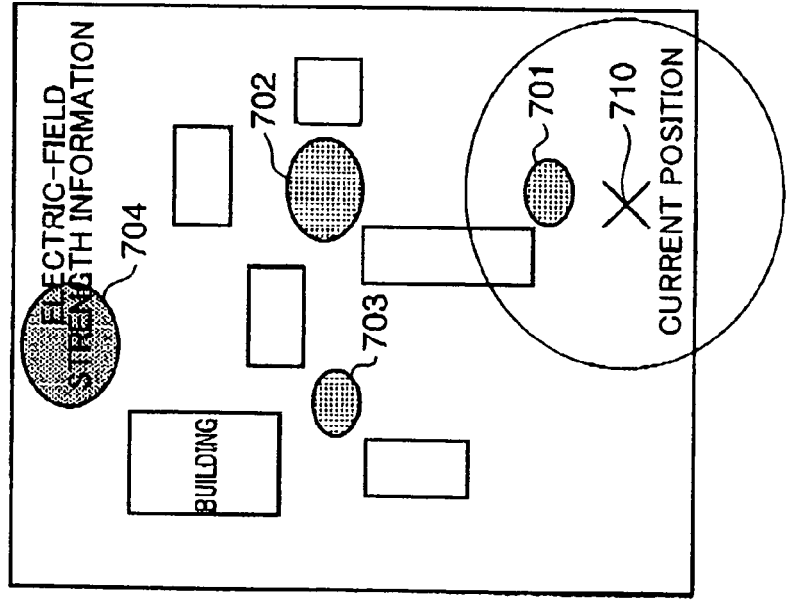

FIG. 29 is a representation, showing the processing for acquiring electric-field strength information from a server and setting an electric-field strength management table. FIG. 29A shows the position in which the electric-field strength information is acquired. FIG. 29B shows an example of the electric-field strength information. In FIG. 29B, the user stays at the center of a circle, and a broadcast antenna is located on the exact north of the user. Each dashed-line arrow indicates the direction of the user's gaze. Each white arrow indicates the direction of antenna directivity. The solid-line arrow indicates the direction in which the electric-field strength comes to the maximum. In the example of FIG. 29B, it points to the north. The obliquely hatched area represents the electric-field strength.

As shown in FIG. 29A, in the database 3, there are stored, in advance, electric-field strength information which is obtained by relating the latitude and longitude of several places 701, 702, 703 and 704 to the electric-field strength value in each direction at each place 701, 702, 703 and 704.

For example, in the current position 710 shown in FIG. 29A, if a view is started, the portable television-broadcast reception unit 1 acquires information on the current position in the current position 710. Then, the portable television-broadcast reception unit 1 transmits the current-position information via the network 4 to the server 2. The server 2 acquires, from the database 3, the electric-field strength information which corresponds to a place 701 closest to the current-position information it has received. Then, it transmits this electric-field strength information to the portable television-broadcast reception unit 1. The portable television-broadcast reception unit 1 receives the electric-field strength information from the server 2. It sets this electric-field strength information as an initial value in the electric-field strength management table. At this time, the portable television-broadcast reception unit 1 acquires the electric-field strength information shown in FIG. 29B. The processing after the setting in the electric-field strength management table is the same as that of the first embodiment, and thus, its description is omitted.

In this way, the current position is measures, and the measured current-position information is transmitted to the server 2. Then, the electric-field strength value in the current positions received from the server 2, and the received electric-field strength value is set as an initial value in the storage section. Therefore, without changing the direction of the directional antenna 10 and measuring the electric-field strength value, the electric-field strength value in the current position can be acquired. This helps save a user from doing such an operation, so that the direction of the directional antenna 10 can be swiftly led.

Next, a variation of the fifth embodiment will be described. In the variation of the fifth embodiment, information on the electric-field strength around the current position is acquired from a server. Then, a user is guided to a point at which a further sufficient electric-field strength can be obtained. In the variation of the fifth embodiment, the configuration of a portable television-broadcast reception unit is the same as the configuration shown in FIG. 27 and FIG. 28, and thus, its description is omitted.

FIG. 30 is a representation, showing a variation of the process of the fifth embodiment for guiding a user up to a place in which a further sufficient electric-field strength can be obtained. First, at a current point 811, the control section 40 acquires information on the current position from the GPS 100 and outputs it to the communication processing section 103. Next, the communication processing section 103 transmits the current-position information via the network 4 to the server 2. On the basis of the current-position information it has received, the server 2 acquires, from the database 3, information on the electric-field strength in a guidance point where the greatest electric-field strength can be obtained within a predetermined range from the current position. Incidentally, the predetermined range means the inside of a circle whose center lies in the current position and which has a predetermined radius. In FIG. 30, information is acquired information on the electric-field strength in a guidance point 812 within the predetermined range from the current point 811.

Next, the server 2 transmits the electric-field strength information it has acquired to the portable television-broadcast reception unit 1. The communication processing section 103 receives the electric-field strength information transmitted by the server 2 and outputs it to the control section 40. Base on the electric-field strength information it has received from the server 2 and the current position information it has received from the GPS 100, the control section 40 calculates the direction of the guidance point 812 from the current point 811 as a starting point and the distance between the current point 811 and the guidance point 812.

Next, the control section 40 regards the direction of antenna directivity as the direction in which a user 801 goes forward. Then, it regards the direction of the guidance point 812 as the direction in which the electric-field strength becomes the maximum, and turns an image on a display screen. Thereby, the upper part of the display screen indicates the user 801's walking direction, and the upper part of the image on the display screen indicates the direction of the guidance point 812. In FIG. 30, the guidance point 812 lies to the north of the current point 811, and the direction of a directional antenna is the north shown by an arrow 802. Hence, the image is displayed with remaining unturned.

Next, the control section 40 displays the distance from the current point 811 to the guidance point 812. Then, after the portable television-broadcast reception unit 1 arrives at the guidance point 812, the control section 40 ends the processing for leading the user 801 to the guidance point 812. Sequentially, the control section 40 sets the electric-field strength information it has received in the electric-field strength management table. On the basis of this setting in the electric-field strength management table, the control section 40 turns the image so that the image's upper part is oriented to the direction in which the electric-field strength becomes the maximum. The following process is the same as that of the first embodiment, and thus, its description is omitted.

Similarly, the guidance point 812 is set as the current point, and then, a processing is executed for leading the user 801 to a guidance point 813. If there is no guidance point at which the greatest electric-field strength can be obtained within a predetermined range from the current point, the range may also be widened to search for a guidance point. Further, if a plurality of guidance points are located within a predetermined range, the guidance point is chosen at which the greatest electric-field strength can be obtained. Still further, if the electric-field strength at the current point is greater than that at a guidance point, the processing for leading the user 801 may also be terminated. Besides, if there are several guidance points within a predetermined range, a guidance point closest to the current point may also be selected.

In this way, the current position is measures, and the measured current-position information is transmitted to the server 2. Then, the electric-field strength value in a predetermined position around the current position and position information on the predetermined position is received from the server 2. Sequentially, a received image is turned so that the image's upper part is oriented to the direction of the received predetermined position. If the portable television-broadcast reception unit 1 reaches the predetermined position, the received electric-field strength value is set in the storage section 30.

Therefore, a user who carries the portable television-broadcast reception unit 1 can be led to a position in which a sufficient electric-field strength value is obtained. Besides, when the user arrives at the position where the sufficient electric-field strength value can be obtained, the electric-field strength value is automatically set. This helps save the user from measuring the electric-field strength value.

In the variation of the fifth embodiment, the control section 40 may also display electric-field strength information which it acquires from the server 2 on a display screen. FIG. 31 is a table, showing an example of electric-field strength information displayed on a display screen. In the example shown in FIG. 31, several pieces of electric-field strength information within a predetermined range from the current point are acquired. Each piece of electric-field strength information is made up of the latitude and longitude of a guidance point and the electric-field strength in each direction at the guidance point. In addition, map information may also be stored beforehand in the storage section 30. In that case, the control section 40 reads the map information from the storage section 30 and displays, as an image, the map information which indicates a guidance position.

Sixth Embodiment

Next, a portable television-broadcast reception unit according to a sixth embodiment of the present invention will be described. FIG. 32 is a block diagram, showing the configuration of the portable television-broadcast reception unit according to the sixth embodiment of the present invention. The portable television-broadcast reception unit shown in FIG. 32 is provided with an input section 104, in addition to the configuration of the first embodiment shown in FIG. 1.

The input section 104 accepts an instruction to register an electric-field strength value by a user when an image is displayed in the display section 50. When the registration instruction is accepted by the input section 104, the control section 40 registers, as a threshold value in the storage section 30, the electric-field strength value which corresponds to the direction of the directional antenna 10. In this embodiment, the input section 104 corresponds to an example of the electric-field strength registration acceptance section, and the control section 40 corresponds to an example of the electric-field strength registration section. The operation executed using this threshold value has been already described using FIG. 11, and thus, its description is omitted.

As described above, when an image is displayed, an instruction is accepted to register an electric-field strength value by a user. When the registration instruction is accepted, the electric-field strength value which corresponds to the direction of the directional antenna 10 is registered as a threshold value in the storage section 30. Therefore, for each user, a viewable electric-field strength threshold value can be set, thus helping display an image satisfactory to each user.

In this embodiment, a user's electric-field strength value registration instruction is accepted, and when the registration instruction is accepted, the electric-field strength value which corresponds to the directional antenna 10's direction is registered as a threshold value in the storage section 30. However, the present invention is not limited especially to this. Specifically, the following operations may also be executed: the input section 104 accepts an instruction to register the directional antenna 10's direction by a user when an image is displayed in the display section 50; when the registration instruction is accepted by the input section 104, the control section 40 registers the directional antenna 10's direction in the storage section 30; and the image-turn processing section 80 turns an image received by the television-broadcast reception section 20, so that the image's upper part is oriented to the direction registered in the storage section 30. In this case, the input section 104 corresponds to an example of the direction registration acceptance section and the control section 40 corresponds to an example of the direction registration section.

In this case, when an image is displayed, an instruction is accepted to register the direction of the directional antenna 10 by a user. When the registration instruction is accepted, the directional antenna 10's direction is registered in the storage section 30. Then, a received image is turned so that the image's upper part is oriented to the direction registered in the storage section 30. Therefore, after the directional antenna 10's direction is registered in the storage section 30, without measuring the electric-field strength value, the image can be turned so that the image's upper part is oriented to the direction registered in the storage section 30. This makes it possible to lead the direction of the directional antenna 10 more quickly.

Seventh Embodiment

Next, a portable television-broadcast reception unit according to a seventh embodiment of the present invention will be described. FIG. 33 is a block diagram, showing the configuration of the portable television-broadcast reception unit according to the seventh embodiment of the present invention. The portable television-broadcast reception unit shown in FIG. 33 is provided with an antenna drive section 105, in addition to the configuration of the first embodiment shown in FIG. 1.

The control section 40 calculates the angle of the direction in which the maximum electric-field strength can be obtained with the current direction of the directional antenna 10. The antenna drive section 105 moves the directional antenna 10 by the angle calculated by the control section 40. In this embodiment, the control section 40 and the antenna drive section 105 correspond to an example of the antenna movement section. Except for the fact that the directional antenna 10 is automatically moved, the operation of this embodiment is the same as that of the first embodiment, and thus, its description is omitted.

In this way, the angle is calculated between the direction where the maximum electric-field strength is obtained and the current direction of the directional antenna 10. Then, the directional antenna 10 is automatically moved by the calculated angle. This helps save a user the trouble to change the directional antenna 10's direction.

Herein, the specific embodiments described so far mainly include an invention which has the following configurations.

A portable television-broadcast reception unit according to an aspect of the present invention, comprising: a broadcast reception section which receives a broadcast wave using a directional antenna; a direction measurement section which measures the direction of the directional antenna; a quality measurement section which measures information on the quality of a broadcast wave received by the directional antenna; a storage section which stores measurement information including a direction measured by the direction measurement section and information on a quality measured by the quality measurement section; a control section which controls the measurement of a direction by the direction measurement section and the measurement of information on a quality by the quality measurement section, updates the measurement information stored in the storage section, and selects the direction where the best quality is obtained; an image turn section which turns an image received by the broadcast reception section, so that the upper part of the image is oriented to the direction selected by the control section where the best quality is obtained; and a display section which displays an image turned by the image turn section.

A television-broadcast reception method according to another aspect of the present invention, including: a broadcast receiving step of receiving a broadcast wave using a directional antenna; a direction measuring step of measuring the direction of the directional antenna; a quality measuring step of measuring information on the quality of a broadcast wave received by the directional antenna; a storing step of storing measurement information including a direction measured in the direction measuring step and information on a quality measured in the quality measuring step; a controlling step of controlling the measurement of a direction in the direction measuring step and the measurement of information on a quality in the quality measuring step, updates the measurement information stored in the storage section, and selects the direction where the best quality is obtained; an image turning step of turning an image received in the broadcast receiving step, so that the upper part of the image is oriented to the direction selected in the controlling step where the best quality is obtained; and a displaying step of displaying an image turned in the image turning step.

A television-broadcast reception program according to another aspect of the present invention, allowing a computer to function as: a storage section which stores measurement information including a direction measured by a direction measurement section which measures the direction of a directional antenna and information on a quality measured by a quality measurement section which measures information on the quality of a broadcast wave received by the directional antenna; a control section which controls the measurement of a direction by the direction measurement section and the measurement of information on a quality by the quality measurement section, updates the measurement information stored in the storage section, and selects the direction where the best quality is obtained; an image turn section which turns an image received by a broadcast reception section which receives a broadcast wave using the directional antenna, so that the upper part of the image is oriented to the direction selected by the control section where the best quality is obtained; and a display section which displays an image turned by the image turn section.

A computer-readable record medium in which a television-broadcast reception program is recorded according to another aspect of the present invention, allowing a computer to function as: a storage section which stores measurement information including a direction measured by a direction measurement section which measures the direction of a directional antenna and information on a quality measured by a quality measurement section which measures information on the quality of a broadcast wave received by the directional antenna; a control section which controls the measurement of a direction by the direction measurement section and the measurement of information on a quality by the quality measurement section, updates the measurement information stored in the storage section, and selects the direction where the best quality is obtained; an image turn section which turns an image received by a broadcast reception section which receives a broadcast wave using the directional antenna, so that the upper part of the image is oriented to the direction selected by the control section where the best quality is obtained; and a display section which displays an image turned by the image turn section.

According to these configurations, a broadcast wave is received by a directional antenna. In a storage section, measurement information is stored which includes the direction of the directional antenna and information on the quality of a broadcast wave received by the directional antenna. The measurement of a direction, of the directional antenna and the measurement of information on a quality is controlled, the measurement information stored in the storage section is updated, and the direction where the best quality can be obtained is selected. Then, a received image is turned so that the upper part of the image is oriented to the selected direction where the best quality can be obtained, and the turned image is displayed.

Therefore, the upper part of a displayed image coincides with the direction in which the best quality of a broadcast wave can be obtained. This helps lead the direction, of a directional antenna toward the image's upper part. Thereby, the directional antenna's direction can be easily changed to a direction where an enough quality to watch television is obtained.

Furthermore, in the above described portable television-broadcast reception unit, it is preferable that: the quality measurement section include an electric-field strength measurement section which measures the electric-field strength value of a broadcast wave received by the directional antenna; the storage section store measurement information including a direction measured by the direction measurement section and an electric-field strength value measured by the electric-field strength measurement section; the control section control the measurement of a direction by the direction measurement section and the measurement of an electric-field strength value by the electric-field strength measurement section, update the measurement information stored in the storage section, and select the direction where the maximum electric-field strength value is obtained; and the image turn section turn an image received by the broadcast reception section, so that the upper part of the image is oriented to the direction selected by the control section so that the maximum electric-field strength value is obtained.

According to this configuration, in a storage section, measurement information is stored which includes the direction of the directional antenna and the electric-field strength value of a broadcast wave received by the directional antenna. The measurement of a direction of the directional antenna and the measurement of an electric-field strength value is controlled, the measurement information stored in the storage section is updated, and the direction where the greatest electric-field strength can be obtained is selected. Then, a received image is turned so that the upper part of the image is oriented to the selected direction where the greatest electric-field strength can be obtained, and the turned image is displayed.

Therefore, the upper part of a displayed image coincides with the direction in which the greatest electric-field strength can be obtained. This helps lead the direction of a directional antenna toward the image's upper part. Thereby, the directional antenna's direction can be easily changed to a direction where an enough electric-field strength to watch television is obtained.

Moreover, in the above described portable television-broadcast reception unit, preferably: the direction measurement section should output a direction change notification when detecting a change in the direction of the directional antenna; the electric-field strength measurement section should output an electric-field strength change notification when detecting a change in an electric-field strength; and every time a specific time elapses, if the direction change notification is inputted or if the electric-field strength change notification is inputted, the control section should control the measurement of a direction by the direction measurement section and the measurement of an electric-field strength value by the electric-field strength measurement section.

According to this configuration, a direction change notification is outputted when a change is detected in the direction of the directional antenna, and an electric-field strength change notification is outputted when a change is detected in an electric-field strength. Every time a specific time elapses, if the direction change notification is inputted or if the electric-field strength change notification is inputted, then control is executed of the measurement of a direction and the measurement of an electric-field strength value.

Therefore, every time a specific time elapses, if the direction of the directional antenna is changed or if the electric-field strength value is changed, the direction measurement and the electric-field strength measurement are controlled. Thereby, the newest measurement information can always be stored, thus maintaining a good reception quality constantly.

In addition, in the above described portable television-broadcast reception unit, it is preferable that: the control section decide whether or not the electric-field strength value which corresponds to the current direction of the directional antenna is equal to, or above, a threshold value; and if the decision is made that the electric-field strength value is equal to, or above, the threshold value, the display section display an image received by the broadcast reception section with kept unturned.

According to this configuration, a decision is made whether or not the electric-field strength value which corresponds to the current direction of the directional antenna s equal to, or above, a threshold value. If the decision is made that the electric-field strength value is equal to, or above, the threshold value, a received image is displayed with remaining unturned. Therefore, if the electric-field strength value is equal to, or above, the threshold value, in other words, if a good reception quality can be obtained, then a television broadcast can be viewed without changing the direction of a directional antenna.

Furthermore, in the above described portable television-broadcast reception unit, preferably: if the decision is made that the electric-field strength value is below the threshold value, the broadcast reception section should omit at least a part of a decoding processing for decoding a broadcast wave received by the directional antenna; and without displaying an image received by the broadcast reception section, the display section should display only a display frame for identifying the upper part of the image. According to this configuration, if the decision is made that the electric-field strength value is below a threshold value, at least a part of this decoding processing is omitted. Then, only a display frame for recognizing the image's upper part is displayed without displaying a received image. This makes it possible to cut down the power consumption.

Moreover, in the above described portable television-broadcast reception unit, it is preferable that there be further provided with: an electric-field strength registration acceptance section which accepts an instruction to register an electric-field strength value by a user when an image is displayed in the display section; and an electric-field strength registration section which registers the electric-field strength value which corresponds to the direction of the directional antenna as the threshold value in the storage section when a registration instruction is accepted by the electric-field strength registration acceptance section.

According to this configuration, when an image is displayed, an instruction is accepted to register an electric-field strength value by a user. When the registration instruction is accepted, the electric-field strength value which corresponds to the direction of the directional antenna is registered as a threshold value in the storage section. Therefore, for each user, a viewable electric-field strength threshold value can be set, thus helping display an image satisfactory to each user.

In addition, in the above described portable television-broadcast reception unit, preferably: a clock section should be further provided; and the control section should store the measurement information as well as a time acquired from the clock section in the storage section, and if a period of time which is equal to, or beyond, a threshold value elapses from the time when the measurement information stored in the storage section is acquired, then should delete the measurement information from the storage section.

According to this configuration, if a period of time which is equal to, or beyond, a threshold value elapses from the time when measurement information is acquired, the measurement information is deleted from the storage section. This helps prevent an image from being displayed based on old measurement information.

Furthermore, in the above described portable television-broadcast reception unit, it is preferable that: a position measurement section be further provided which measures the current position of the portable television-broadcast reception unit; and the control section store the measurement information as well as positional information acquired from the position measurement section in the storage section, and if the portable television-broadcast reception unit moves by a distance which is equal to, or beyond, a threshold value from the position where the measurement information stored in the storage section is acquired, then delete the measurement information from the storage section.

According to this configuration, if the portable television-broadcast reception unit moves by a distance which is equal to, or beyond, a threshold value from the position where measurement information is acquired, the measurement information is deleted from the storage section. This helps prevent an image from being displayed based on old measurement information.

Moreover, in the above described portable television-broadcast reception unit, preferably, the control section should select a direction where an electric-field strength value which is equal to, or above, a threshold value is obtained, and if there are a plurality of directions where an electric-field strength value which is equal to, or above, a threshold value is obtained, then should select, out of the plurality of directions, the direction in which the turn angle from the current direction of directional antenna comes to the minimum.

According to this configuration, a direction is chosen in which an electric-field strength value equal to, or above, the threshold value can be obtained. Then, if there are several directions in which the electric-field strength value becomes equal to, or above, the threshold value, then the direction in which the turn angle from the directional antenna at present becomes the minimum is chosen from among the several directions. This makes it possible to change the directional antenna's direction quickly.

In addition, in the above described portable television-broadcast reception unit, it is preferable that: the storage section store the threshold value; and a change section be further provided which changes the threshold value. According to this configuration, the threshold value is stored in the storage section, and this threshold value is changed. Therefore, a user can set the threshold value to a desirable one, thus helping make each decision based on this threshold value.

Furthermore, in the above described portable television-broadcast reception unit, preferably, when turning the image, the image-turn processing section should reduce the size so that the whole image is within the display screen of the display section. According to this configuration, when an image is turned, its size is reduced so that the entire image is within the display screen of the display section. Therefore, the upper part of the image is certainly displayed within the display screen. This helps recognize the image's upper part easily.

Moreover, in the above described portable television-broadcast reception unit, it is preferable that the display section display an image turned by the image turn section within a display frame for identifying the upper part of the image. According to this configuration, a turned image is displayed within a display frame for recognizing the image's upper part. Thereby, the display frame is displayed even if the image cannot be displayed because the electric-field strength value lowers. Therefore, the direction of the display frame's upper part can be checked, thus helping recognize the direction in which the maximum electric-field strength value is obtained.

In addition, in the above described portable television-broadcast reception unit, preferably, the display section should have a circular or elliptic display screen. According to this configuration, even if the display screen is circular or elliptic, the direction in which the maximum electric-field strength value is obtained can be easily recognized.

Furthermore, in the above described portable television-broadcast reception unit, it is preferable that: the portable television-broadcast reception unit be further provided with a direction registration acceptance section which accepts an instruction to register a direction of the directional antenna by a user when an image is displayed in the display section, and a direction registration section which registers the direction of the directional antenna in the storage section when a registration instruction is accepted by the direction registration acceptance section; and the image turn section turn an image received by the broadcast reception section, so that the upper part of the image is oriented to the direction registered in the storage section.

According to this configuration, when an image is displayed, an instruction is accepted to register the direction of the directional antenna by a user. When the registration instruction is accepted, the directional antenna's direction is registered in the storage section. Then, a received image is turned so that the image's upper part is oriented to the direction registered in the storage section. Therefore, after the directional antenna's direction is registered in the storage section, without measuring the electric-field strength value, the image can be turned so that the image's upper part is oriented to the direction registered in the storage section. This makes it possible to lead the direction of the directional antenna more quickly.

Moreover, in the above described portable television-broadcast reception unit, preferably, there should be further provided with an antenna movement section which calculates the angle of the direction selected by the control section so that the maximum electric-field strength value is obtained with the current direction of the directional antenna, and automatically moves the directional antenna by this angle.

According to this configuration, the angle is calculated between the direction where the maximum electric-field strength is obtained and the current direction of the directional antenna. Then, the directional antenna is automatically moved by the calculated angle. This helps save a user the trouble to change the directional antenna's direction.

In addition, in the above described portable television-broadcast reception unit, it is preferable that: the portable television-broadcast reception unit be further provided with a position measurement section which measures the current position of the portable television-broadcast reception unit, and a communication section which transmits information on the current position measured by the position measurement section to a server, and receives the electric-field strength value in the current position from the server; and the control section set the electric-field strength value received by the communication section as an initial value in the storage section.

According to this configuration, the current position is measures, and the measured current-position information is transmitted to the server. Then, the electric-field strength value in the current position is received from the server, and the received electric-field strength value is set as an initial value in the storage section. Therefore, without changing the direction of the directional antenna and measuring the electric-field strength value, the electric-field strength value in the current position can be acquired. This helps save a user from doing such an operation, so that the direction of the directional antenna can be swiftly led.

Furthermore, in the above described portable television-broadcast reception unit, preferably: the portable television-broadcast reception unit should be further provided with a position measurement section which measures the current position of the portable television-broadcast reception unit, and a communication section which transmits information on the current position measured by the position measurement section to a server, and receives, from the server, the electric-field strength value in a predetermined position around the current position and positional information on the predetermined position; and the image turn section should turn an image received by the broadcast reception section, so that the upper part of the image is oriented to the direction of the predetermined position received by the communication section.

According to this configuration, the current position is measures, and the measured current-position information is transmitted to the server. Then, the electric-field strength value in a predetermined position around the current position and position information on the predetermined position is received from the server. Sequentially, a received image is turned so that the image's upper part is oriented to the direction of the received predetermined position. Therefore, a user who carries the portable television-broadcast reception unit can be led to a position in which a sufficient electric-field strength value is obtained.

Moreover, in the above described portable television-broadcast reception unit, it is preferable that; the quality measurement section include a bit-error rate measurement section which measures the bit error rate of a broadcast wave received by the directional antenna; the storage section store measurement information including a direction measured by the direction measurement section and a bit error rate measured by the bit-error rate measurement section; the control section control the measurement of a direction by the direction measurement section and the measurement of a bit error rate by the bit-error rate measurement section, update the measurement information stored in the storage section, and select the direction where the minimum bit error rate is obtained; and the image turn section turn an image received by the broadcast reception section, so that the upper part of the image is oriented to the direction selected by the control section so that the minimum bit error rate is obtained.

According to this configuration, in the storage section, measurement information is stored which includes the direction of the directional antenna and the bit error rate of the broadcast wave received by the directional antenna. The measurement of the direction of the directional antenna and the measurement of the bit error rate are controlled. Then, the measurement information stored in the storage section is updated, and the direction in which the minimum bit error rate can be obtained is selected. Next, a received image is turned so that the upper part of the image is oriented to the selected direction in which the minimum bit error rate can be obtained. Then, the turned image is displayed.

Therefore, the upper part of a displayed image coincides with the direction in which the minimum bit error rate is obtained. Hence, the direction of a directional antenna is led toward the image's upper part. This makes it possible to change the directional antenna's direction easily to a direction where an enough electric-field strength to watch television can be obtained.

INDUSTRIAL APPLICABILITY

The portable television-broadcast reception unit, television-broadcast reception method, television-broadcast reception program, and computer-readable record medium in which a television-broadcast reception program is recorded according to the present invention are capable of changing the direction of a directional antenna easily to a direction where an enough quality to watch television can be obtained. Hence, they can be used as a portable television-broadcast reception unit, a television-broadcast reception method, a television-broadcast reception program, a computer-readable record medium in which a television-broadcast reception program is recorded, and the like, which receive a ground-wave digital television broadcast or a ground-wave analog television broadcast for a portable terminal.

In addition to these, they can also be used as a navigation system or the like for guiding visitors, without using a GPS, to the main hall in the grounds of an event.

The invention claimed is:

1. A portable television-broadcast reception unit, comprising:
   a broadcast reception section which receives a broadcast wave using a directional antenna;
   a direction measurement section which measures the direction of the directional antenna;
   a quality measurement section which measures information on the quality of a broadcast wave received by the directional antenna;
   a storage section which stores measurement information including a direction measured by the direction measurement section and information on a quality measured by the quality measurement section;
   a control section which controls the measurement of a direction by the direction measurement section and the measurement of information on a quality by the quality measurement section, updates the measurement information stored in the storage section, and selects the direction where the best quality is obtained;
   an image turn section which turns an image received by the broadcast reception section, so that the upper part of the image is oriented to the direction selected by the control section where the best quality is obtained; and
   a display section which displays an image turned by the image turn section.

2. The portable television-broadcast reception unit according to claim 1, wherein:
   the quality measurement section includes an electric-field strength measurement section which measures the electric-field strength value of a broadcast wave received by the directional antenna;
   the storage section stores measurement information including a direction measured by the direction measurement section and an electric-field strength value measured by the electric-field strength measurement section;
   the control section controls the measurement of a direction by the direction measurement section and the measurement of an electric-field strength value by the electric-field strength measurement section, updates the measurement information stored in the storage section, and selects the direction where the maximum electric-field strength value is obtained; and
   the image turn section turns an image received by the broadcast reception section, so that the upper part of the image is oriented to the direction selected by the control section so that the maximum electric-field strength value is obtained.

3. The portable television-broadcast reception unit according to claim 2, wherein:
   the direction measurement section outputs a direction change notification when detecting a change in the direction of the directional antenna;
   the electric-field strength measurement section outputs an electric-field strength change notification when detecting a change in an electric-field strength; and
   every time a specific time elapses, if the direction change notification is inputted or if the electric-field strength change notification is inputted, the control section controls the measurement of a direction by the direction measurement section and the measurement of an electric-field strength value by the electric-field strength measurement section.

4. The portable television-broadcast reception unit according to claim 2, wherein:
   the control section decides whether or not the electric-field strength value which corresponds to the current direction of the directional antenna is equal to, or above, a threshold value; and
   if the decision is made that the electric-field strength value is equal to, or above, the threshold value, the display section displays an image received by the broadcast reception section with kept unturned.

5. The portable television-broadcast reception unit according to claim 4, wherein:
   if the decision is made that the electric-field strength value is below the threshold value, the broadcast reception section omits at least a part of a decoding processing for decoding a broadcast wave received by the directional antenna; and
   without displaying an image received by the broadcast reception section, the display section displays only a display frame for identifying the upper part of the image.

6. The portable television-broadcast reception unit according to claim 4, further comprising:
   an electric-field strength registration acceptance section which accepts an instruction to register an electric-field strength value by a user when an image is displayed in the display section; and
   an electric-field strength registration section which registers the electric-field strength value which corresponds to the direction of the directional antenna as the threshold value in the storage section when a registration instruction is accepted by the electric-field strength registration acceptance section.

7. The portable television-broadcast reception unit according to claim 1, further comprising
   a clock section, wherein
   the control section stores the measurement information as well as a time acquired from the clock section in the storage section, and if a period of time which is equal to, or beyond, a threshold value elapses from the time when the measurement information stored in the storage section is acquired, then deletes the measurement information from the storage section.

8. The portable television-broadcast reception unit according to claim 1, further comprising
a position measurement section which measures the current position of the portable television-broadcast reception unit, wherein
the control section stores the measurement information as well as positional information acquired from the position measurement section in the storage section, and if the portable television-broadcast reception unit moves by a distance which is equal to, or beyond, a threshold value from the position where the measurement information stored in the storage section is acquired, then deletes the measurement information from the storage section.

9. The portable television-broadcast reception unit according to claim 2, wherein the control section selects a direction where an electric-field strength value which is equal to, or above, a threshold value is obtained, and if there are a plurality of directions where an electric-field strength value which is equal to, or above, a threshold value is obtained, then selects, out of the plurality of directions, the direction in which the turn angle from the current direction of the directional antenna comes to the minimum.

10. The portable television-broadcast reception unit according to claim 4, wherein
the storage section stores the threshold value, further comprising
a change section is further provided which changes the threshold value.

11. The portable television-broadcast reception unit according to claim 1, wherein when turning the image, the image turn section reduces the size so that the whole image is within the display screen of the display section.

12. The portable television-broadcast reception unit according to claim 1, wherein the display section displays an image turned by the image turn section within a display frame for identifying the upper part of the image.

13. The portable television-broadcast reception unit according to claim 12, wherein the display section has a circular or elliptic display screen.

14. The portable television-broadcast reception unit according to claim 1, further comprising:
a direction registration acceptance section which accepts an instruction to register a direction of the directional antenna by a user when an image is displayed in the display section; and
a direction registration section which registers the direction of the directional antenna in the storage section when a registration instruction is accepted by the direction registration acceptance section; wherein
the image turn section turns an image received by the broadcast reception section, so that the upper part of the image is oriented to the direction registered in the storage section.

15. The portable television-broadcast reception unit according to claim 2, further comprising an antenna movement section which calculates the angle of the direction selected by the control section so that the maximum electric-field strength value is obtained with the current direction of the directional antenna, and automatically moves the directional antenna by this angle.

16. The portable television-broadcast reception unit according to claim 2, further comprising:

a position measurement section which measures the current position of the portable television-broadcast reception unit; and
a communication section which transmits information on the current position measured by the position measurement section to a server, and receives the electric-field strength value in the current position from the server; wherein
the control section sets the electric-field strength value received by the communication section as an initial value in the storage section.

17. The portable television-broadcast reception unit according to claim 2, further comprising:
a position measurement section which measures the current position of the portable television-broadcast reception unit; and
a communication section which transmits information on to a server, and receives, from the server, the electric-field strength value in a predetermined position around the current position and positional information on the predetermined position; wherein
the image turn section turns an image received by the broadcast reception section, so that the upper part of the image is oriented to the direction of the predetermined position received by the communication section.

18. The portable television-broadcast reception unit according to claim 1, wherein:
the quality measurement section includes a bit-error rate measurement section which measures the bit error rate of a broadcast wave received by the directional antenna;
the storage section stores measurement information including a direction measured by the direction measurement section and a bit error rate measured by the bit-error rate measurement section;
the control section controls the measurement of a direction by the direction measurement section and the measurement of a bit error rate by the bit-error rate measurement section, updates the measurement information stored in the storage section, and selects the direction where the minimum bit error rate is obtained; and
the image turn section turns an image received by the broadcast reception section, so that the upper part of the image is oriented to the direction selected by the control section so that the minimum bit error rate is obtained.

19. A television-broadcast reception method, including: a broadcast receiving step of receiving a broadcast wave using a directional antenna;
a direction measuring step of measuring the direction of the directional antenna;
a quality measuring step of measuring information on the quality of a broadcast wave received by the directional antenna;
a storing step of storing measurement information including a direction measured in the direction measuring step and information on a quality measured in the quality measuring step;
a controlling step of controlling the measurement of a direction in the direction measuring step and the measurement of information on a quality in the quality measuring step, updates the measurement information stored in the storage section, and selects the direction where the best quality is obtained;
an image turning step of turning an image received in the broadcast receiving step, so that the upper part of the image is oriented to the direction selected in the controlling step where the best quality is obtained; and a displaying step of displaying an image turned in the image turning step.

20. A computer-readable record medium in which a television-broadcast reception program is recorded, allowing a computer to function as:

a storage section which stores measurement information including a direction measured by a direction measurement section which measures the direction of a directional antenna and information on a quality measured by a quality measurement section which measures information on the quality of a broadcast wave received by the directional antenna;

a control section which controls the measurement of a direction by the direction measurement section and the measurement of information on a quality by the quality measurement section, updates the measurement information stored in the storage section, and selects the direction where the best quality is obtained;

an image turn section which turns an image received by a broadcast reception section which receives a broadcast wave using the directional antenna, so that the upper part of the image is oriented to the direction selected by the control section where the best quality is obtained; and a display section which displays an image turned by the image turn section.

* * * * *